United States Patent
Sarkar et al.

(10) Patent No.: US 8,349,510 B2
(45) Date of Patent: Jan. 8, 2013

(54) SOLID STATE ELECTROCHEMICAL CELL HAVING RETICULATED ELECTRODE MATRIX AND METHOD OF MANUFACTURING SAME

(75) Inventors: Partha Sarkar, Edmonton (CA); Mark Lewis Richardson, San Francisco, CA (US); Luis Yamarte, Edmonton (CA); Lorne Johanson, Edmonton (CA)

(73) Assignee: Alberta Innovates—Technology Futures, Edmonton (CA)

( * ) Notice: Subject to any disclaimer, the term of this patent is extended or adjusted under 35 U.S.C. 154(b) by 1065 days.

(21) Appl. No.: 12/056,169

(22) Filed: Mar. 26, 2008
(Under 37 CFR 1.47)

(65) Prior Publication Data
US 2008/0286625 A1 Nov. 20, 2008

Related U.S. Application Data

(60) Provisional application No. 60/907,199, filed on Mar. 26, 2007.

(51) Int. Cl.
*H01M 8/10* (2006.01)

(52) U.S. Cl. ........ 429/465; 429/475; 429/479; 429/486; 429/488; 429/491; 429/535

(58) Field of Classification Search ............... 429/464, 429/465, 475, 477, 479, 481, 483, 486, 488, 429/489, 535, 491
See application file for complete search history.

(56) References Cited

U.S. PATENT DOCUMENTS

| | | | |
|---|---|---|---|
| 5,543,239 A | 8/1996 | Virkar | |
| 5,993,988 A * | 11/1999 | Ohara et al. | 429/527 |
| 6,017,647 A | 1/2000 | Wallin | |
| 6,428,920 B1 | 8/2002 | Badding | |
| 6,846,511 B2 | 1/2005 | Visco | |
| 7,141,329 B2 | 11/2006 | Hong | |
| 7,153,601 B2 | 12/2006 | Mardilovich | |
| 2004/0121222 A1* | 6/2004 | Sarkar et al. | 429/45 |
| 2005/0026017 A1* | 2/2005 | Seabaugh et al. | 429/30 |
| 2005/0092597 A1* | 5/2005 | O'Neil et al. | 204/192.15 |
| 2005/0186466 A1* | 8/2005 | Shibata et al. | 429/40 |
| 2005/0214616 A1* | 9/2005 | Kumar et al. | 429/33 |
| 2005/0238796 A1* | 10/2005 | Armstong et al. | 427/58 |
| 2006/0127749 A1* | 6/2006 | Christie et al. | 429/121 |
| 2007/0015045 A1* | 1/2007 | Lee et al. | 429/45 |
| 2007/0072046 A1* | 3/2007 | Thompson et al. | 429/38 |

OTHER PUBLICATIONS

Sholklapper et al., "LMS-Infiltrated Solid Oxide Fuel Cell Cathodes" Electrochemical and Solid-State Letters 9 (8) A376-A378 (2006) The Electrochemical Society, US.

(Continued)

*Primary Examiner* — Patrick Ryan
*Assistant Examiner* — Ben Lewis
(74) *Attorney, Agent, or Firm* — Jeffer Mangels; Butler & Mitchell LLP

(57) ABSTRACT

A solid state electrochemical cell comprises a dense electrolyte layer; at least one reticulated electrode matrix (REM) of ion-conducting material partially sintered on the gas impermeable electrolyte layer, and electrode material located substantially within the REM. The REM has a majority of pores with an average pore size of less than micron. The REM can also have a porosity of 5 to 80%, thickness at or below 3.00 microns, and a mean grain size of 0.01 to 3.00 microns.

44 Claims, 17 Drawing Sheets

OTHER PUBLICATIONS

Sora, et al. "Analysis of the electrical behaviour of conductor/insulator composites using effective medium theories", Journal of the European Ceramic Society, 22:1645-1652, 2002.

Todorovska, et al. "Spray pyrolysis deposition of YSZ and YSZ-Pt composite films", Applied Surface Sciences, 252:1266-1275, 2005.

Serra, et al., "Nano-structuring of solid oxide fuel cells cathodes", Topics in Catalysis, 40(1-4):123-131, 2006.

Lu, et al. "LSM cathodes with reaction-infiltrated nanoparticles", J. Electrochemical Soc., 153(6):A1115-A1119, 2006.

* cited by examiner

SOLID STATE ELECTROCHEMICAL CELL HAVING RETICULATED ELECTRODE MATRIX AND METHOD OF MANUFACTURING SAME

FIELD OF INVENTION

This invention relates generally to solid state electrochemical cells, and in particular to a solid state electrochemical cell having a reticulated electrode matrix and a method of manufacturing same.

BACKGROUND

Solid oxide fuel cells ("SOFC") and other solid state electrochemical cells rely for their operation on the separation of a reduction-oxidation reaction into its two half-reactions that occur in physically isolated regions of a device, with a component called the electrolyte used to conduct ions between these regions. A simplified diagram depicting the structure is presented in FIG. 1 (Prior Art). Following the flows from top to bottom in the diagram, oxygen (or another oxygen-containing gas such as air) and electrical current diffuse and flow down through a porous cathode current collector 16 ("CCC") to a porous cathode electrocatalyst 25 and then to a three phase boundary 3 ("TPB") at the interface between the cathode 25 and the electrolyte 10. At the TPB the oxygen molecules are converted onto oxide ions ($O^{2-}$) which then enter a dense electrolyte 10 and flow to an anode TPB boundary 5, where they (in the case of an SOFC) oxidize the gaseous fuel molecules and release to the anode 12 the electrons that they originally received at the TPB 3 of the cathode.

Solid oxide electrochemical cells require specialized materials in order to function. The electrolyte must be composed of a material that is gas-impermeable, has adequately low electron conductivity, and adequately high oxide ion conductivity. The details of a particular cell design determine the adequacy of these conductivities. Materials that provide generally acceptable properties for the electrolyte include Yttrium-doped Zirconium Oxide ("YSZ"), Scandium-doped Zirconium Oxide ("SSZ"), Scandium-Cerium-doped Zirconia ("SCSZ"), aliovalent-cation (a cation with different oxidation states than the host cation) doped Ceria and doped Lanthanum Gallate. Gadolinium-doped Ceria ("GDC") and Samarium-doped Ceria ("SDC") will provide adequate properties in an oxidizing atmosphere, however the electron conductivity increases to unacceptable levels in the reducing atmosphere of the anode side of the electrolyte at above 700° C. Doped Ceria is, therefore, still useful as an oxide ion conductor in the oxidizing atmosphere of the cathode, and can be used as a cathode or anode component or an electrolyte for low-temperature operation.

Another class of material that is required for solid oxide electrochemical cell operation is an electrocatalyst, which is a material that has an adequately high electron conductivity as well as surface activity for the adsorption and catalytic dissociation of oxygen molecules into atoms and reduction of the atoms to oxide ions. Such materials include platinum, silver, and Lanthanum-doped Strontium Manganate (LSM).

There exist materials which provide both useful levels of electron conduction as well as oxide ion conduction, and some of these also are active for the catalytic dissociation and reduction of oxygen. These so-called Mixed Ionic Electronic Conductors ("MIEC") are often employed in cathode designs of solid oxide electrochemical cells. Such materials include, Samarium-doped Strontium Cobaltite ("SSC"), Lanthanum Strontium Ferrite (LSF), Lanthanum Strontium Cobalt Ferrite ("LSCF").

To carry out the task of conducting electrons into the cathode and to a location where wires or other conductors may be attached for connection to external circuits, a current collector, composed of a porous layer of materials such as gold, silver, silver-palladium alloy, platinum, stainless steel, ferritic steel, $In_2O_3$ is employed.

It is clear from the above descriptions that various of these materials may be employed in multiple roles in a cell, with the actual material selection in any particular case often being based on economics, the compatibility of the physical and/or chemical properties of a combination of materials, simplicity of fabrication, etc.

Oxide-ion conducting electrochemical cells rely upon a gas-impermeable electrolyte component which conducts oxide ($O^{2-}$) ions but which does not conduct electrons (i.e. the electronic conductivity is negligible). The oxide ions originate in the form of oxygen molecules in a gas phase, e.g. air or oxygen gas and must be converted to oxide ions and then introduced into the electrolyte. This is the function of the electron-conducting cathode electrocatalyst, which is in intimate contact with the electrolyte, and, more specifically, the function of the three-phase boundary (TPB) between the cathode, electrolyte, and gas phases. Since the cathode must allow the gas phase to penetrate to the cathode-electrolyte interface, the cathode is generally porous.

Present at the TPB are all of the species required for the production of oxide ions and their introduction into the electrolyte: molecular oxygen in the gas phase, electrons in the cathode, and oxide ion vacancies in the electrolyte. If the cathode material is an electronic conductor only, i.e. it does not conduct oxide ions, then the TPB comprises one or more one-dimensional line(s). However, if the cathode material is a mixed-electronic-ionic conductor (MIEC) then the TPB can be extended to the two-dimensional internal surface area of the porous cathode or, at least, the small portion of that area that is in close proximity to the electrolyte if the ionic conductivity of the MIEC is much lower that that of the electrolyte. The cathode may also consist of a combination of electron conducting, ion conducting, and MIEC materials.

In addition to the presence of the requisite species, to produce oxide ions and introduce them into the electrolyte at a useful rate, it is necessary that an electrocatalyst be present that mediates both the dissociation of molecular oxygen and the reduction of the resulting oxygen atoms to oxide ions. Either the entire cathode may consist of a porous structure of electrocatalyst, or the electrocatalyst may be present only in a portion of the cathode, e.g. that portion that is in close proximity to the electrolyte.

In general, the cathode structure also includes a current collector component, which is an outer layer composed of a porous material with high electronic conductivity and which is in electrical contact with at least one of the electron-conducting materials within the cathode structure. Wires are then generally bonded to the current collector in order to provide a high-conductance path for electron flow from the external circuit.

It is well known in the art that, currently, the rate-limiting steps in solid oxide electrochemical cell operation are those that take place at and near the cathode-electrolyte interface, i.e. the TPB. The reaction rate at the TPB depends on the total length or area of the TPB as well as the specific activity of the combination of materials and materials properties that compose the TPB. Therefore it is important to enhance both the extent of the TPB and its specific activity in order to produce higher-performance cells. Also, given that the reactions mentioned above and the mobility of oxide ions are thermally activated processes, such enhancement may also serve to lower the temperature at which adequate performance may be achieved. Lowering the operating temperature of the cell provides significant technological and economic advantages given the increased number of associated component materials that may be employed at lower temperatures as well as the increased conductivity of the electronic conductors that are used as current collectors.

Many of the materials that are used as electrocatalysts, such as LSM, SSC, etc., have low electronic conductivity relative to metals, and a porous layer of such materials possesses even lower conductivity. In conventional cathode structures, the cathode is relatively thick (~25-50 μm) and causes undesirable resistive power losses (higher total cell resistance). Reduction of the thickness of the high-resistance portion of the cathode structure can therefore significantly increase the efficiency of the cell.

Known methods used to increase the spatial extent of the TPB include enhancing the surface area of the dense electrolyte. This may be done by roughening the surface by sintering electrolyte particles onto the surface or sintering a thick porous coating of electrolyte material onto the surface, thus increasing the total area of the electrolyte available to form the TPB. These methods may also increase the adhesion of the electrocatalyst as well as the current collector layer. However roughening the surface of the electrolyte results in only a minor increase in the surface area, and sintering a thick porous layer to the electrolyte surface requires using pore-formers, such as graphite particles, and generally results in relatively low porosity, high tortuosity, and many grain boundaries within the structure, all of which reduce the efficiency of the cell. In particular, it is known that a porous ion conductor which has a thickness large relative to the grain size has a decreased effective ion conductivity, indicating again that a reduction of the thickness of the cathode structure would be advantageous.

SUMMARY OF THE INVENTION

According to one aspect of the invention, there is provided a solid state electrochemical cell comprising a dense electrolyte layer; at least one layer of ion-conducting material partially sintered on at least one side of the dense electrolyte layer to form a reticulated, or mesh-like, electrode matrix ("REM") having a majority of pores with an average diameter of less than one micron; and electrode material that includes electrocatalyst particles, the electrode material located substantially within the REM. The REM serves as a backbone or support to hold electrode material in place. The electrochemical cell can be a solid oxide cell such as an SOFC. The REM can have a predominantly interstitial porosity of 5 to 80%, thickness of or below 3.00 microns and a mean grain size of 0.010 to 3.00 microns. More particularly, the REM can have a porosity of 10 to 50%. The outer surface of the REM can be coated with an electronically conductive layer which serves as a current collector.

The REM can have an average thickness of one or more ion-conducting particles thick; in particular, the REM can be between one and twenty-five particles thick, or more particularly, between one and ten particles thick, or more particularly, between one and five particles thick. Additionally, the pore spaces of the REM can be filled with a porous ion-conducting material with a majority of pores having an average diameter smaller than that of the average diameter of the majority of pores of the REM, thereby creating a multi-scale hierarchical REM (HREM).

The ion-conducting material of the REM can be the same material as the dense electrolyte. In particular, the ion conducting material of the REM can be selected from the group consisting of aliovalent-cation doped zirconium oxide and cerium oxide, $La_{1-x}Sr_xGa_{1-y}MgyO_{3-\delta}$ (LSGM), yttrium-doped zirconia, scandium-doped zirconia, gadolinium-doped ceria, samarium-doped ceria, and yttrium-doped ceria.

The REM can be a mixture of the ion-conducting material and an electrocatalyst or electron-conducting material, such as LSM. The volume % of the electrocatalyst material can be between 0 and 50% of the mixture. The REM can be a mixture of the ion conducting material and an inert material which acts as a grain growth inhibitor, such as alumina. The volume % of the inert material can be between 0 and 35% of the mixture.

The electrochemical cell can further comprise a porous electrode coating partially sintered on pore walls of the REM. The cathode coating comprises electrocatalyst particles and can additionally comprise at least one material selected from the group consisting of ion-conducting material, electron-conducting material, and mixed ion-electron conducting materials. The electrocatalyst particles can be selected from the group consisting of SSC, LSM, LSF and LSCF, BSCF $(Ba_xSr_{1-x}Co_yFe_{y-1}O_{3-\delta})$. When the REM is for an anode, the electrocatalyst particles can be nickel. The ion-conducting materials can be selected from the group consisting of Yttrium-doped Zirconium Oxide ("YSZ"), Scandium-doped Zirconium Oxide ("SSZ"), Scandium-Cerium-doped Zirconia ("SCSZ"), aliovalent-cation (a cation with different oxidation states than the host cation) doped Ceria and doped Lanthanum Gallate, and the mixed ion-conducting materials can be selected from the group consisting of Yttrium-dopes Strontium Titanate, aliovalent-cation doped Cerium Oxide Additionally, the electrode-material-impregnated REM can be further coated with a porous coating of electron-conducting material that penetrates the voids of the REM/electrode to produce a penetrating electrode current collector (PECC).

According to another aspect of the invention, the REM can be formed within the pore volume of a previously formed porous electrolyte layer located on a gas-impermeable electrolyte layer.

According to another aspect of the invention, there is provided a method of manufacturing an electrochemical cell comprising: applying and then partially sintering ion-conducting material onto at least one side of a dense electrolyte layer to form a REM having a majority of pores with an average pore size of less than one micron, then infiltrating the REM with electrode material including electrocatalyst particles, then heat treating the electrode material to form an electrode. The REM can have at least one of a porosity of 5 to 80%, a thickness of or less than 3.00 microns and a mean grain size of 0.010 to 3.00 microns. The electrode material optionally comprises one or more materials selected from the group consisting of ion-conducting material, electron-conducting material, and mixed ion-electron conducting materials.

The ion-conducting material can be oxide particles, and/or oxide particles from an ion-conducting chemical precursor such as a sol-gel precursor, organo-metallic precursor, nitrate solution precursor. The ion-conducting material can be applied onto the dense electrolyte layer by a technique selected from the group consisting of slurry coating, dip coating, spray coating, spin coating, screen printing, tape casting, brush painting, spray pyrolysis coating, chemical vapor deposition, physical vapor deposition, sputtering, electrostatic casting, electrostatic coating. The partial sintering can be carried out at ≦0.9 fraction of the sintering temperature of the ion-conducting material required to form a dense layer of the ion-conducting material. The ion-conducting material may be part of a suspension that is applied onto the dense electrolyte.

BRIEF DESCRIPTION OF THE DRAWINGS

FIGS. 13 to 15 are schematic side cross-sectional views of the REM infiltrated with ion-conducting particles according to a fifth embodiment of the invention, wherein FIG. 14 is a close up view of the infiltrated porous electrolyte and FIG. 15 is REM infiltrated with PECC.

DETAILED DESCRIPTION OF EMBODIMENTS OF THE INVENTION

Figure 1:
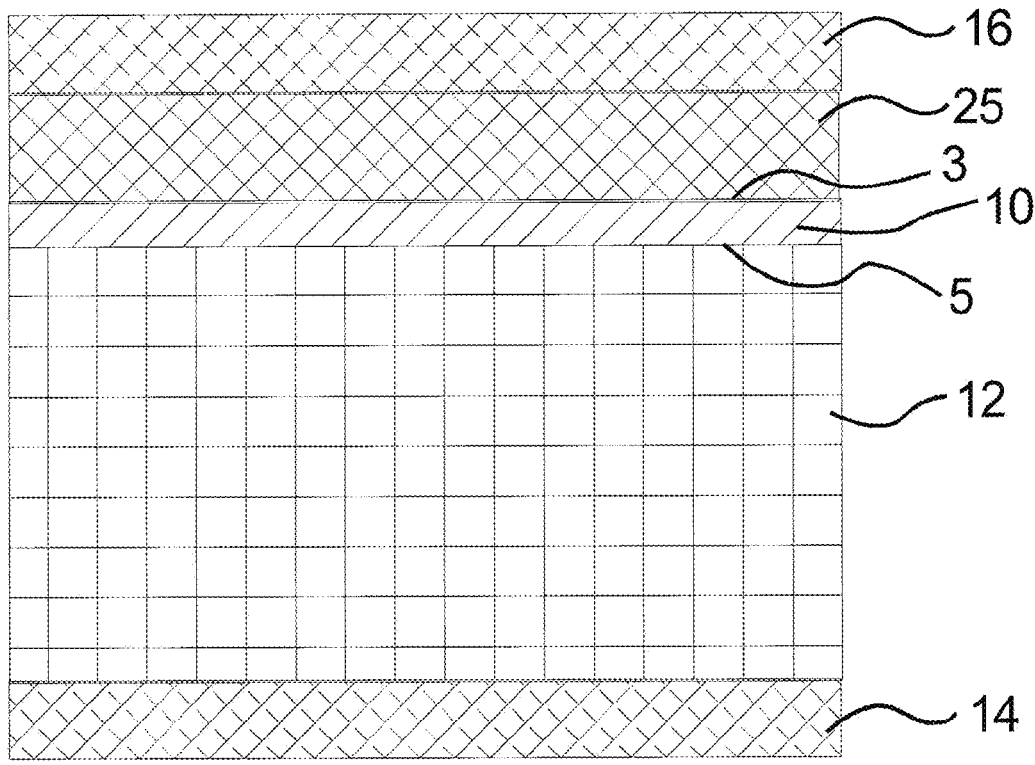
FIG. 1 is a schematic cross-sectional side view of a conventional anode-supported planar SOFC single cell (Prior Art)
Figure 2:
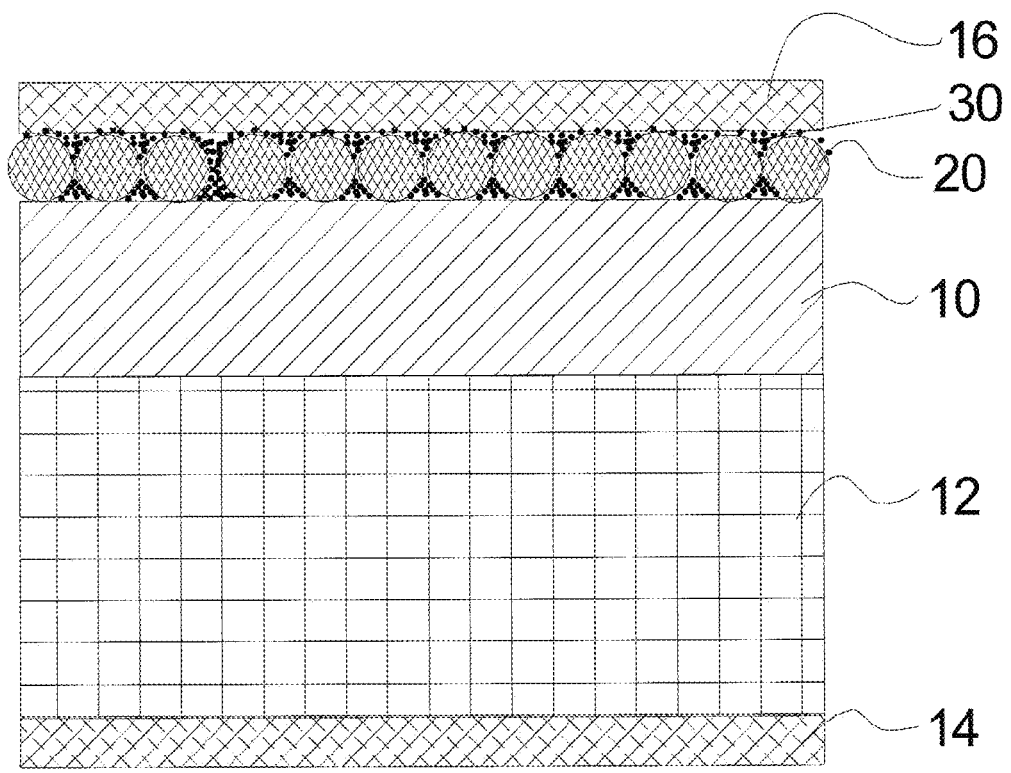
FIG. 2 is a schematic cross-sectional side view of a planar SOFC having a REM according to one embodiment of the invention.

Embodiments of the invention described herein relate to the formation of a thin porous coating of ion conducting material on the surface of a previously-sintered dense electrolyte, thereby creating a reticulated electrode matrix ("REM"). The pore walls, dense electrolyte surface, and external surface of the REM are then coated with a porous layer of electrode electrocatalyst material to form a TPB of large extent. This coating may partially or completely fill the REM pore space (when completely filling the pore space, the coating is porous). The outer surface of the REM is then coated with a porous layer of material with high electronic conductivity which serves as a Cathode Current Collector ("CCC"). The resulting structure is schematically illustrated in FIG. 2. To increase the electrocatalyst loading in the REM and improve the contact between cathode and CCC, further electrocatalyst coatings may be performed after application of CCC to coat the REM and CCC pore walls and CCC outer surface.

The electrocatalyst coating is created by infiltration of an electrocatalyst particle suspension or chemical precursor or precursor chemical mixed with fine electrocatalyst particles into the voids network of the REM, creating a coating on the pore walls, dense electrolyte surface and external surface of the REM. A dense electrolyte is well understood in the art, and generally is understood to mean an electrolyte that is close to theoretical maximum density and has no appreciable gas leakage therethrough. Optionally, the electrocatalyst coating can also be created after forming the CCC by infiltration of an electrocatalyst suspension or chemical precursor or chemical precursor mixed with fine electrocatalyst particles into the void network REM and CCC layer, dense electrolyte surface and external surface of CCC layer. Though this structure somewhat increases the effective thickness of the electrolyte, and therefore the electrolyte ionic path, this increase is outweighed by the resulting large increase in the electrolyte-electrocatalyst contact surface area (increasing the area of the TPB), which results in a significant reduction of the total cell resistance. Also this electrolyte, electrode, and CCC arrangement reduces the average distance between the electrolyte and the CCC, which then reduces the resistance of the cell further since the electronic current travels a much shorter path through the relatively high-resistance electrocatalyst on its way from the TPB to the CCC. In addition, with this electrode design the electrocatalyst forms a porous thin coating on the pore walls inside the REM, and so the considerable thermal mismatch between the electrocatalyst and the electrolyte can be tolerated without mechanical failure of the cell or delamination of the electrocatalyst from the REM pore walls.

Figure 3A:
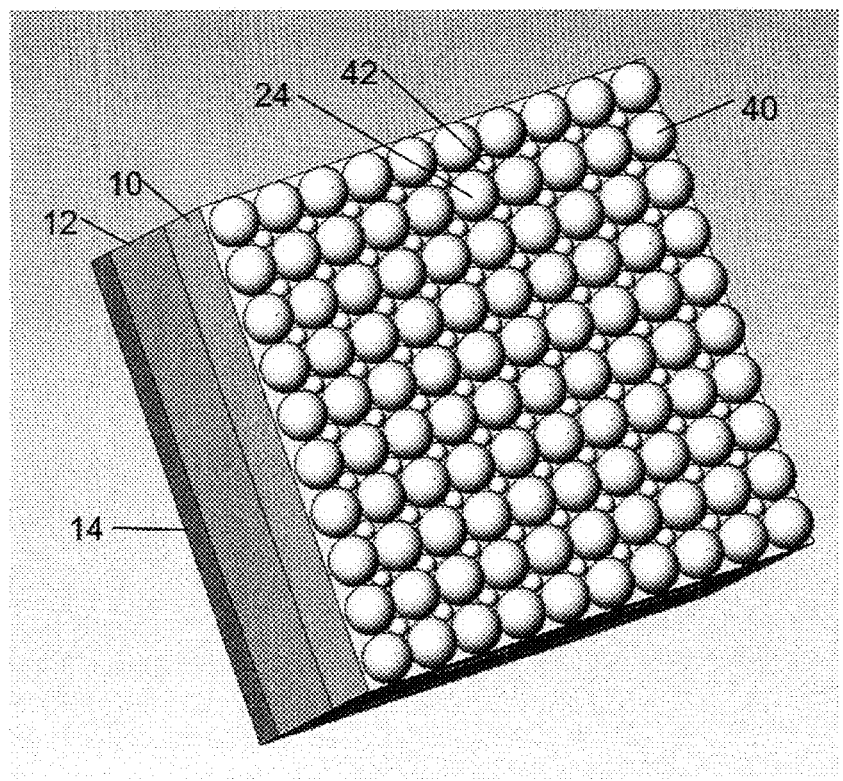
FIGS. 3(a) and (b) are schematic perspective and cross-sectional side views of a planar SOFC having a Hierarchal REM ("HREM") layer according to an alternative embodiment of the invention.
Figure 3B:
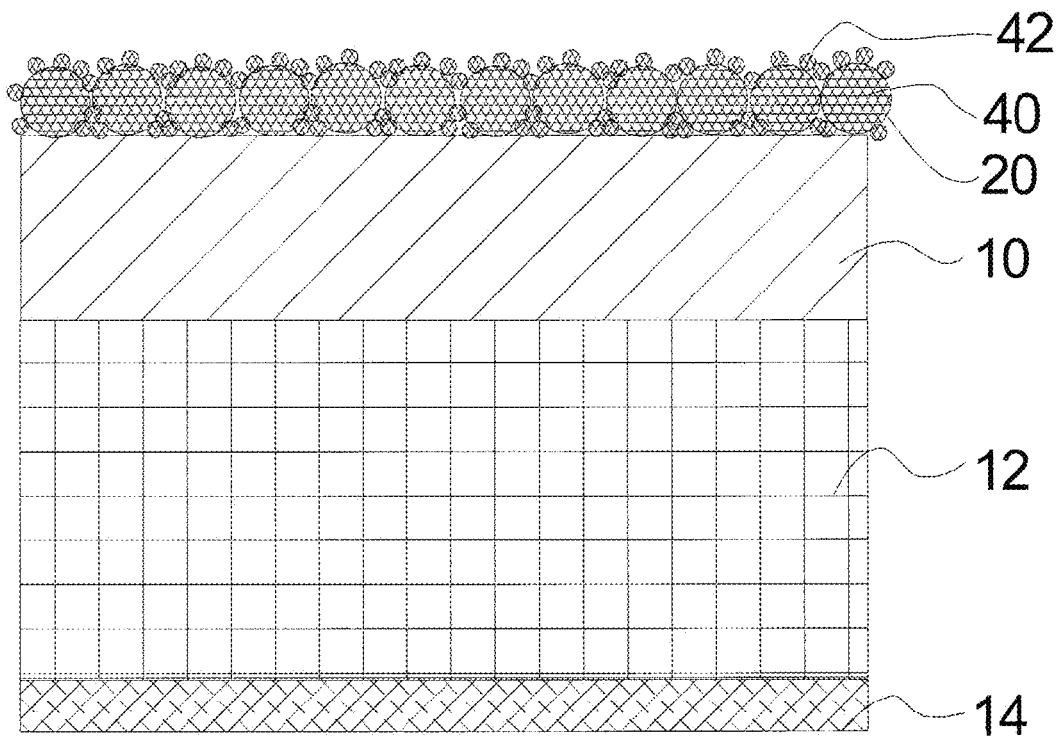

Referring to FIGS. 3 (a)-(c), the pore space of the REM can be optionally filled with porous ion-conducting electrolyte material with an average particle and pore size of the majority of particles and pores smaller than the initial REM thereby creating a multi-scale hierarchical REM ("HREM"). This will greatly increase the internal surface area of the REM, while retaining the mechanical strength and ionic conductance of the initial level of the REM structure. This second level REM can be formed using either the same or a different material as the first level REM, as long as the materials do not react to produce undesirable phases, such as phases with low ionic conductivity, during processing or operation of the cell. This process can be repeated a number of times to produce a third, fourth, etc, level of structure with successively smaller domain/pore sizes, until the pore size of the resulting multi-scale HREM is the same as the minimum desirable thickness of the porous electrocatalyst that is deposited into the pores of the HREM. When creating the HREM, the pore size and porosity of the first level HREM may be larger than that of a comparable non-hierarchical (single level) REM.

Figure 4A:
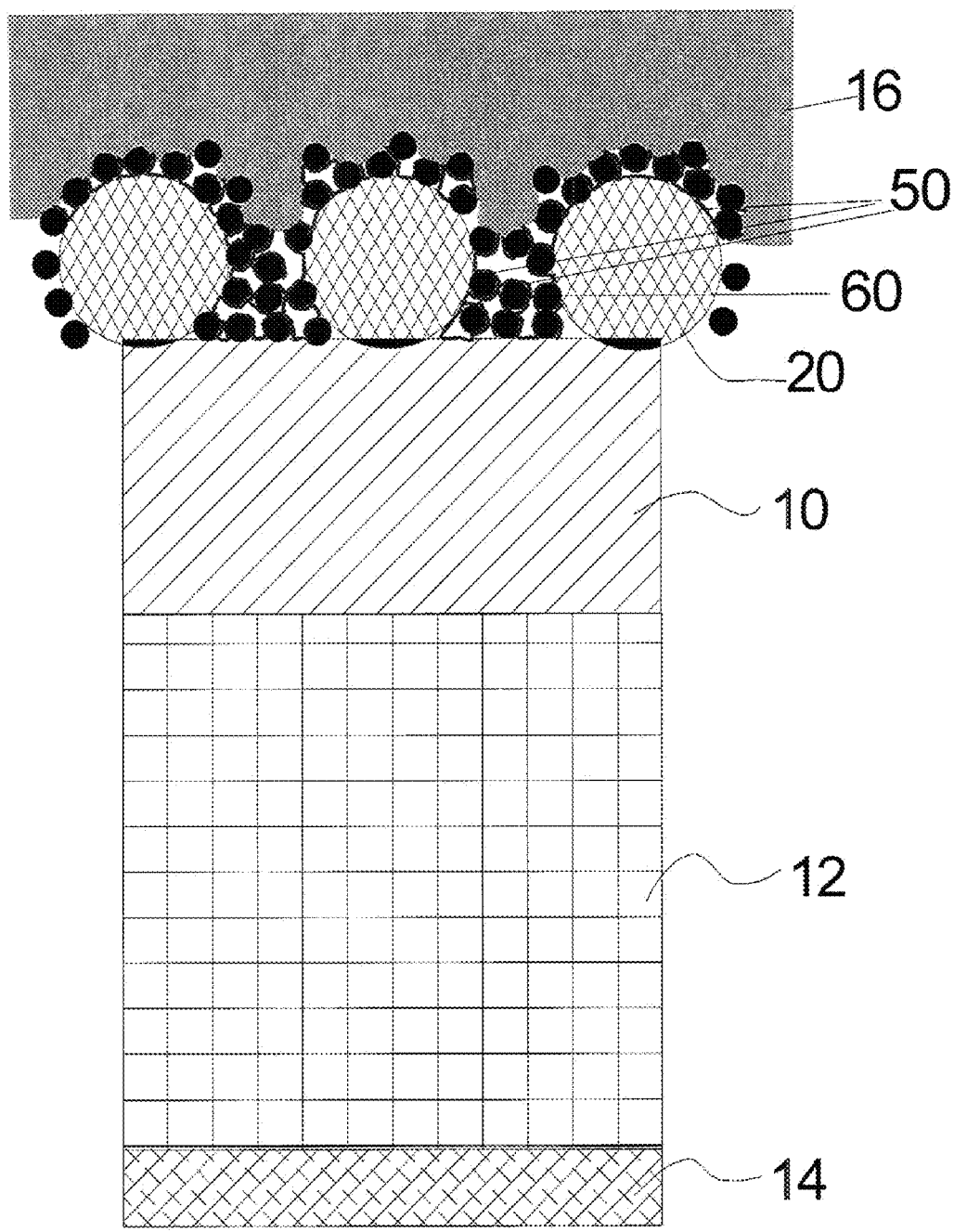
FIGS. 4(a) and (b) are schematic cross-sectional side views of a SOFC having a penetrating electrode current collector according to a fourth embodiment of the invention.
Figure 4B:
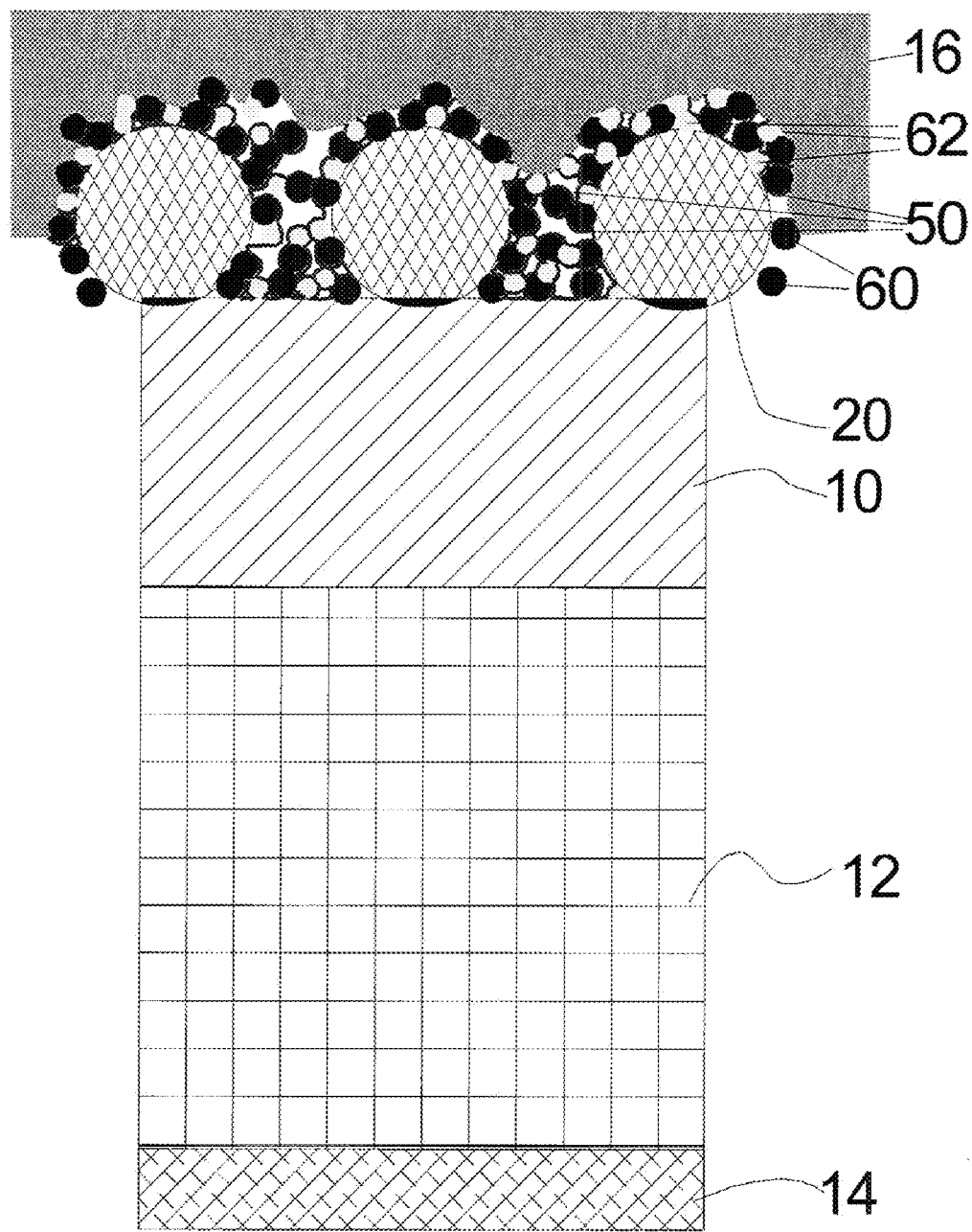

To further decrease the distance that the electronic current must travel through the porous electrocatalyst, the REM/ electrocatalyst structure can optionally be filled with a porous high-conductivity electronic conductor such as metallic conductor which will penetrate the voids of that structure and will, in essence, produce a penetrating electrode current collector ("PECC"), as shown in FIGS. 4 (a)-(b). An HREM can also be provided with a PECC. The electronic current would then only need to traverse an average distance equal to the thickness of the electrocatalyst coating in order to travel from the TPB to the PECC, which will in turn conduct the electronic current to the CCC with very low resistance.

In any of the above cases the porous electrocatalyst coating can optionally contain particles of material possessing high ionic conductivity, such as the electrolyte material, thereby further extending the TPB and increasing electrocatalyst-electrolyte contact. This high ionic conductive phase may help reduce grain growth of the electrocatalyst.

Any of the above cases can optionally be further enhanced by including particles of high electronic conductivity within the porous electrocatalyst coating. Since the electronic conductor can have much higher conductivity than the electrocatalyst, this will further reduce overall resistance.

First Embodiment

Figure 5A:
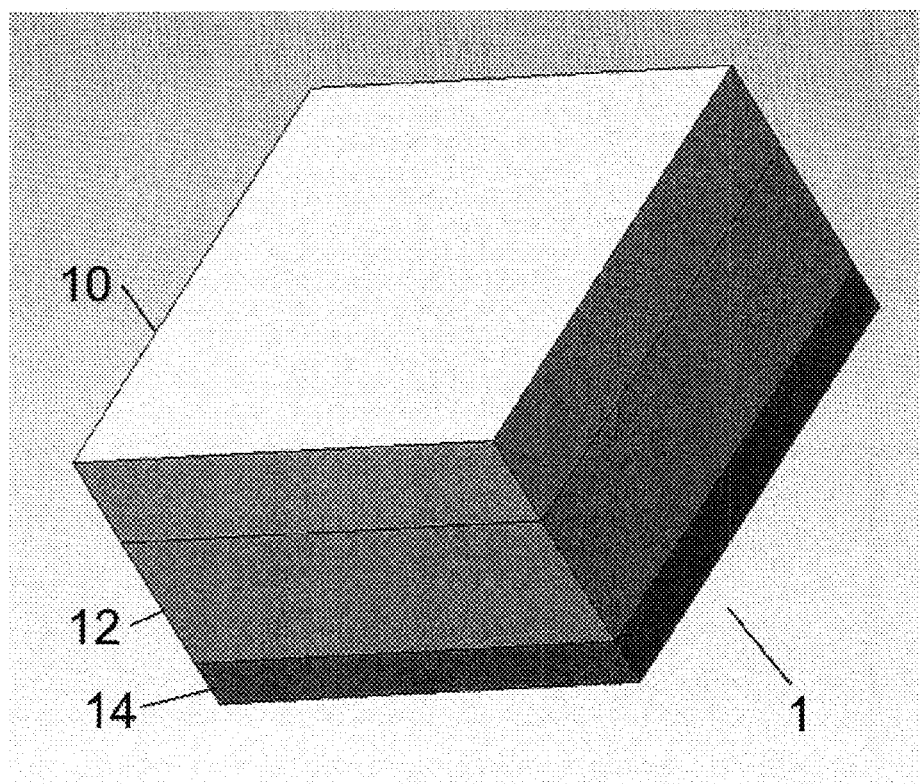
FIGS. 5(a) and (b) are schematic perspective and cross-sectional side views of a portion of the SOFC shown in FIG. 2 and prior to application of the REM.
Figure 5B:
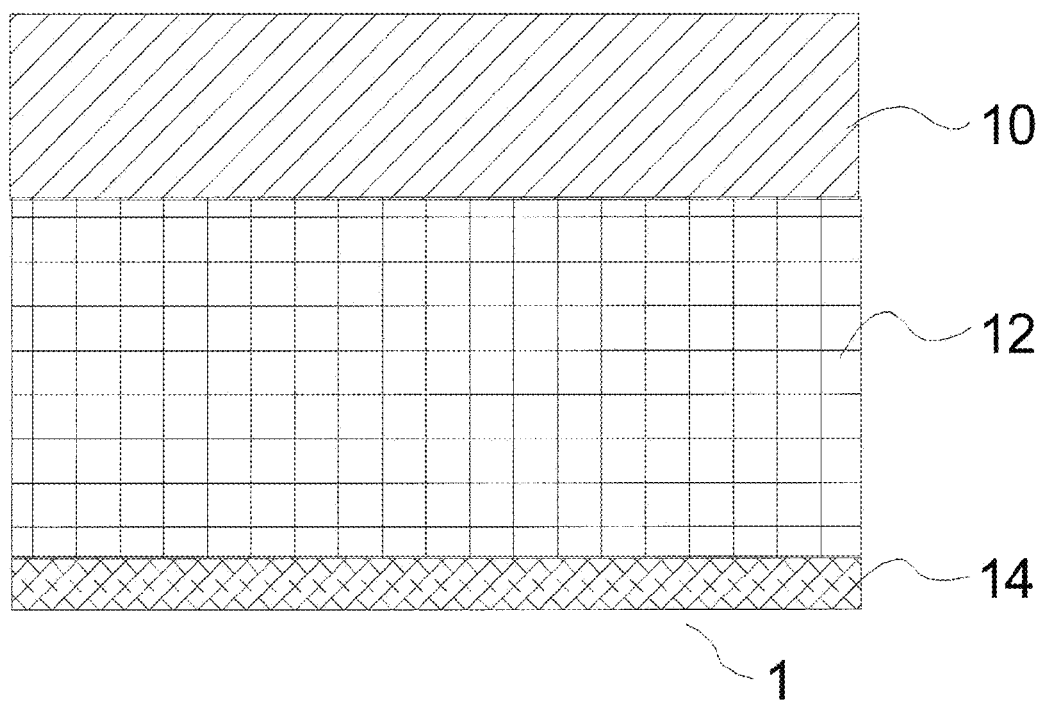

According to a first embodiment of the invention and referring to FIGS. 5 (a)-(b), a partially prefabricated SOFC cell 1 has a sintered dense electrolyte layer 10 (exemplary materials include doped-zirconia, doped-ceria electrolytes), a porous anode layer 12 (exemplary materials include Ni/doped-zirconia, Ni/doped-ceria) and an anode current collector 14 (exemplary materials include Pt, Pt-alloys, Ag, Ag-alloys, Au, Au-alloys, ferritic steel, stainless steel). The anode 12 and anode current collector 14 both have open porosity (connected void network channels) to provide a path necessary for the reactants and the products of the anodic reaction. Although FIG. 5 shows the anode 12 with the current collector 14 already fabricated, both can be optionally applied later in the processing steps. In a planar fuel cell stack the current collector can also be referred to as an 'interconnect' or 'bipolar plate'.

Figure 6A:
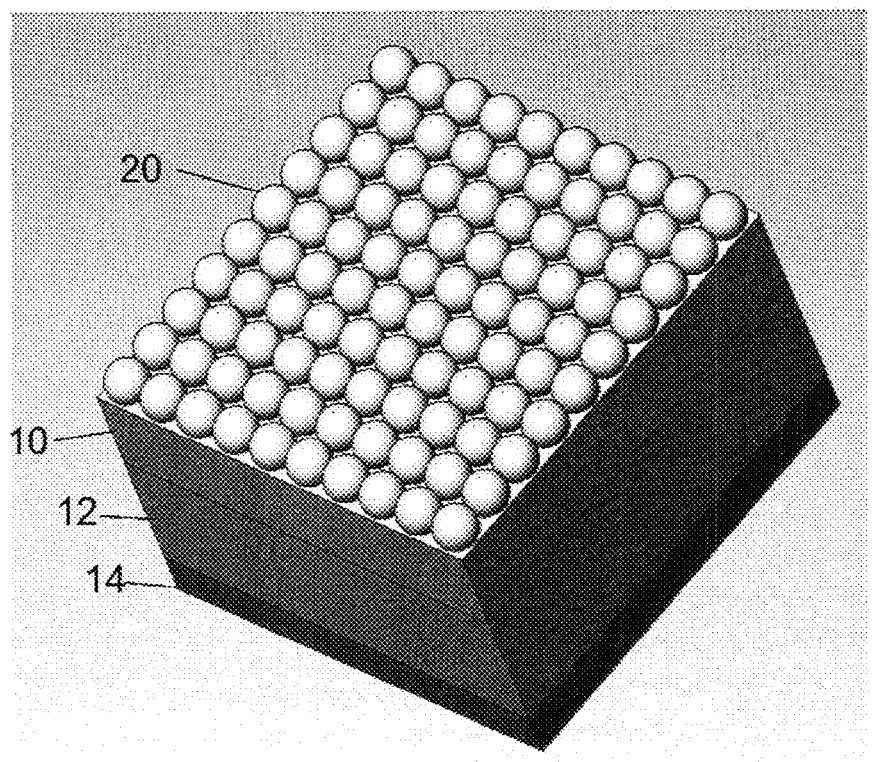
FIGS. 6(a) and (b) are schematic perspective and cross-sectional side views of the portion of the SOFC shown in FIG. 5 with the REM.
Figure 6B:
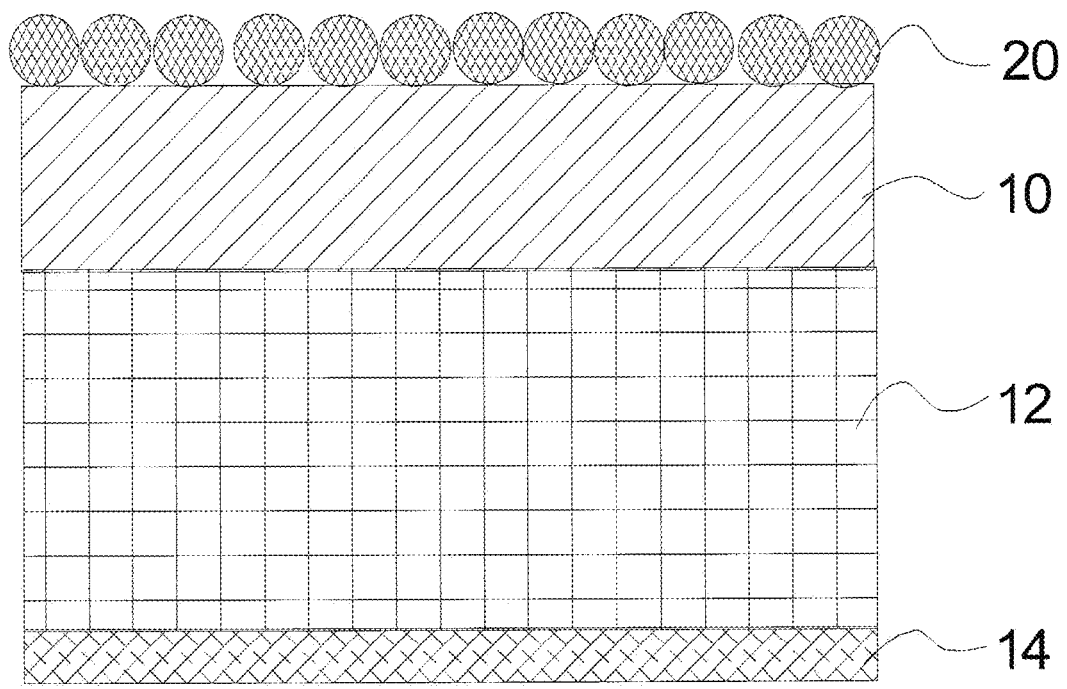

Referring to FIGS. 6 (a)-(b), a porous, predominantly monolayer (i.e., a layer having a substantially single particle thickness) coating of oxide-ion-conducting particles is formed on the surface of the prefabricated gas-impermeable electrolyte layer 10, thereby forming a porous reticulated electrode matrix (REM) 20. The REM 20 can be fabricated from a well dispersed zirconia suspension using a dip coating technique. In the present embodiment, Tosoh's 8 m/o YSZ powder is dispersed in ethanol using polyethylenimine (PEI) dispersant. This mixture is then ball milled or vibromilled for several hours to form a well dispersed stable suspension. This suspension may also contain binder such as polyvinyl butyl to provide green strength to the dip coated layer. A clean dense electrolyte surface is dipped into an YSZ suspension for a few seconds and then withdrawn from the suspension at a constant speed to form a YSZ powder coating on the dense electrolyte surface. The coating is then converted to a porous REM by a relatively low temperature (1000-1150° C.) partial sintering ("partial sintering" means that sintering at a time-temperature cycle chosen in such a way that it does not allow the layer to achieve its maximum density) process that preserves the interstitial voids (pores) between the particles while producing well-formed "necks" between the particles. The partial sintering is carried out such that an REM is formed having a majority, i.e. greater than 50%, of its pores with an average pore diameter of less than one micron. The REM has a porosity of between 10 and 50%, although a pore density range of between 5 and 80% is also acceptable. The partial sintering temperature and time is selected based on the properties of the starting powder, such as particle size and surface area. The mean grain size of the REM oxide ion-conducting particles is between 0.010 and 3.00 microns and thus a partially sintered monolayer will have a thickness of the same range.

When the REM is of the same material as the dense electrolyte layer, the partial sintering should be carried out at or below 0.9 fraction of the sintering temperature of the electrolyte layer. In this first embodiment the sintering temperature of the electrolyte is between 1375° C.-1425° C. and the partial sintering temperature is up to 1150° C.

When the REM is a different material than the dense electrolyte layer, the partial sintering of ion conducting layer should carried out at or below 0.9 fraction of the normal sintering temperature (i.e. the sintering temperature of the ion conducting materials required to form dense layer) of the ion conducting material.

The REM 20 conducts identical types of ionic species as the dense electrolyte layer 10. As a result, a continuous same ionic species conducting electrolyte is formed, which starts at the anode electrolyte interface and ends at the exposed end of the REM 20. In this case, a dense YSZ electrolyte is an oxygen ion conductor and thus the ion-conducting particles of the REM 20 are also oxygen ion conductors. On the other hand, if the dense electrolyte is a proton conductor (i.e. a hydrogen conductor), the ion conducting particles of the REM 20 are also proton conductors, and can be made of doped cerates of strontium and doped cerates of barium. If the dense electrolyte is made of doped strontium cerate, the electrolyte is a hydrogen ion conductor and the REM can made from doped strontium cerate or doped barium cerate as the ion conducting material.

Figure 7:
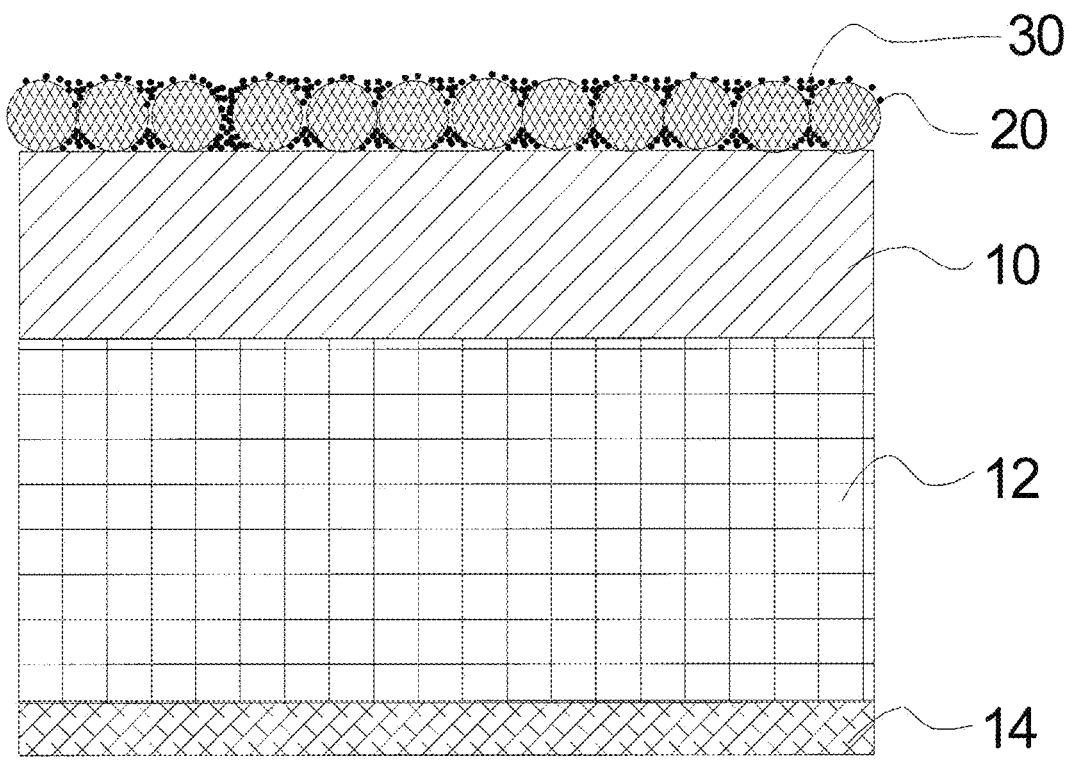
FIG. 7 is a schematic cross-sectional side view of the SOFC shown in FIG. 6 with a cathode electrode applied to the REM.
Figure 8:
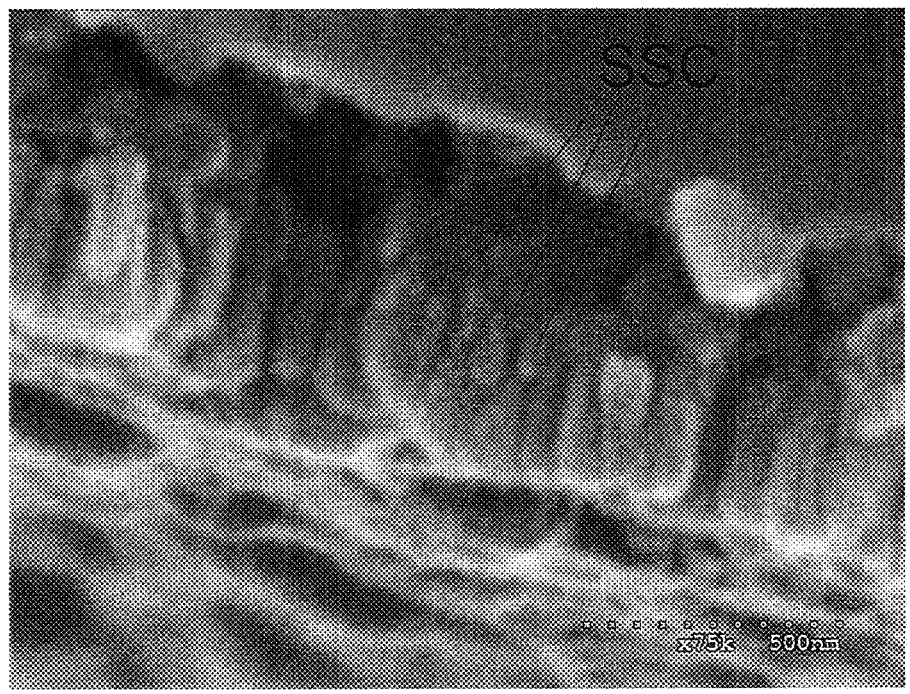
FIG. 8 is a Scanning Electron Micrograph ("SEM") which shows SSC electrocatalyst on YSZ pore walls.

Referring to FIG. 7, a cathode electrode 30 of the SOFC 1 is then formed primarily inside the network of voids of the REM 20 by infiltration methods, employing a particulate suspension of cathode electrocatalyst or a suspension of a mixture of different electrocatalyst particles, or one or more electrocatalyst chemical precursors or one or more particles and electrocatalyst chemical precursor mixture. A nanoscale (10-300 nm) porous electrocatalyst structure is created by precipitation followed by drying and heat treatment at a temperature selected to produce an optimal nanostructure. FIG. 8 is an SEM micrograph which shows SSC electrocatalyst on YSZ pore walls.

After cathode formation and referring to FIG. 2, porous current collectors 16 are applied to the cathode electrode 30 by dip-coating, spraying, or painting a paste of conductive particles and pore-forming sacrificial particles, followed by a heat treatment. The cathode current collector 16, like an anode current collector, may be in the form of grid or other structures, but its main function is to carry the electronic current. In a planar fuel cell stack the current collector can also be referred to as an 'interconnect' or 'bipolar plate'. Although the main function of a current collector 16 is to carry the fuel cell generated electric current (i.e., to carry the electron), it is designed in such a way to allow the flow of reactants and products of the electrode.

Figure 9A:
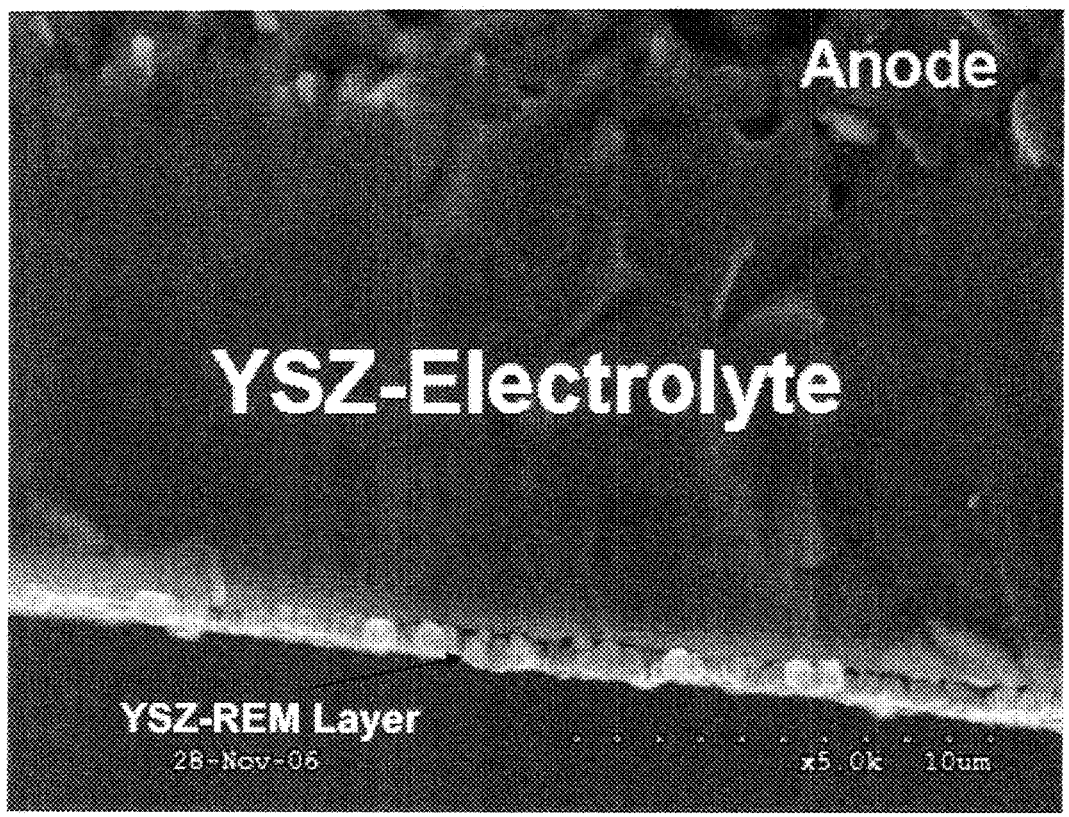
FIG. 9(a) is a SEM cross-sectional side view of part of the REM attached to a gas-impermeable electrolyte layer of the SOFC.
Figure 9B:
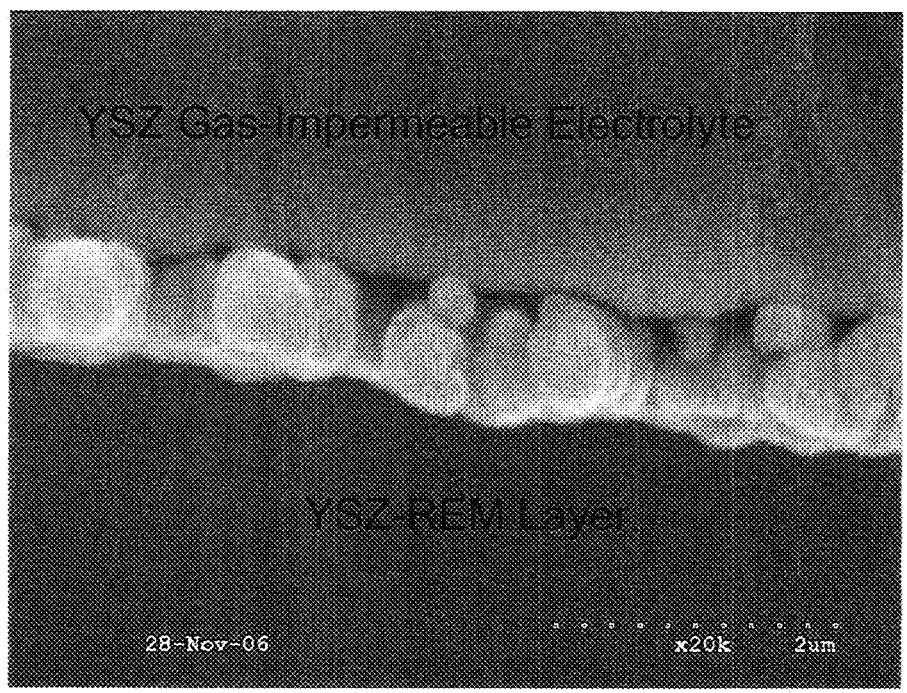
FIG. 9(b) is a close up SEM cross-sectional view of part of the REM.
Figure 10A:
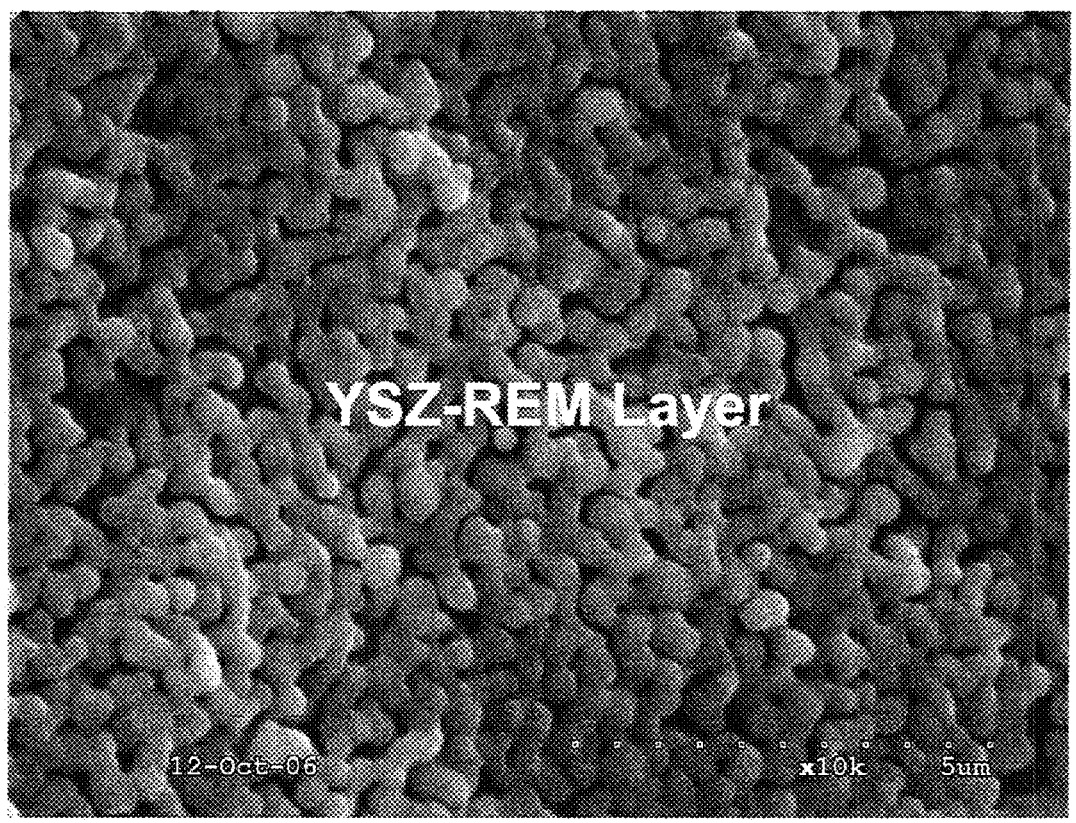
FIGS. 10(a) to (b) are increasing close up SEM views of the REM.
Figure 10:
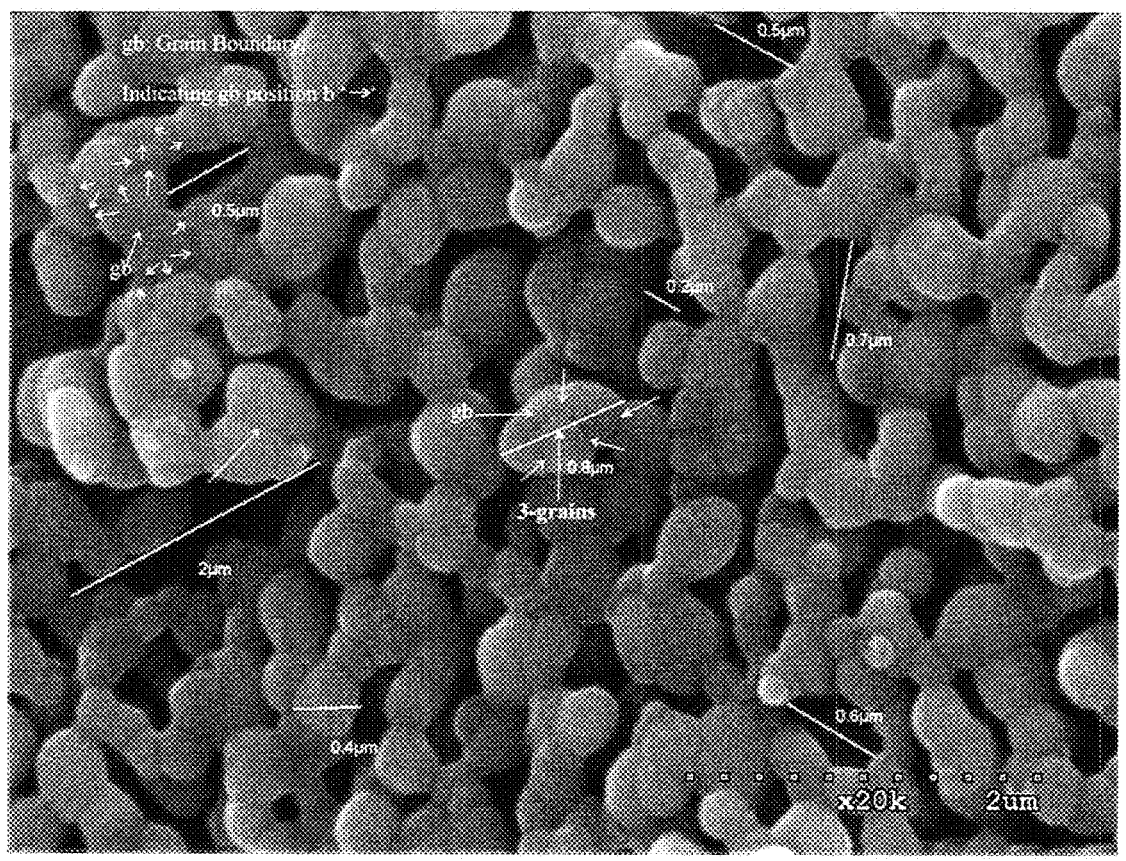

Referring to the cross-sectional fracture surface micrographs shown in FIGS. 9 (a)-(b), the REM 20 thickness is less than 1 micron and has mainly 1-particle thickness, i.e. is essentially a mono layer. The pores in the REM 20 are formed without use of a pore former, and thus are fine and interstitial, in contrast to the pores of a porous layer formed by adding a pore forming agent to a YSZ-suspension used to form the layer. In particular, forming the pores using partial sintering and without the use of pore formers results in an REM having a majority of pores with a very fine average pore diameter, and in the case, less than one micron in diameter. When pore former (such as carbon of graphite particle) is added to a starting suspension or paste, it creates larger diameter non-interstitial pores which increase the effective resistance of the electrolyte. The fine and interstitial pores in the REM 20 formed without the use of pore formers and by partial sintering create a unique microstructure as shown in FIG. 10. In this porous structure, pore diameter is very fine with an average pore diameter below 1 micron or in some cases below 0.5 microns, pore density is high, and the majority of the pores are interconnected creating a porous or void network structure. The REM 20 is a mesh-like structure with low pore and solid phase tortuosity. Under the microscope, the dense electrolyte layer 10 can be seen through the porous network of the REM 20.

Second Embodiment

Figure 11A:
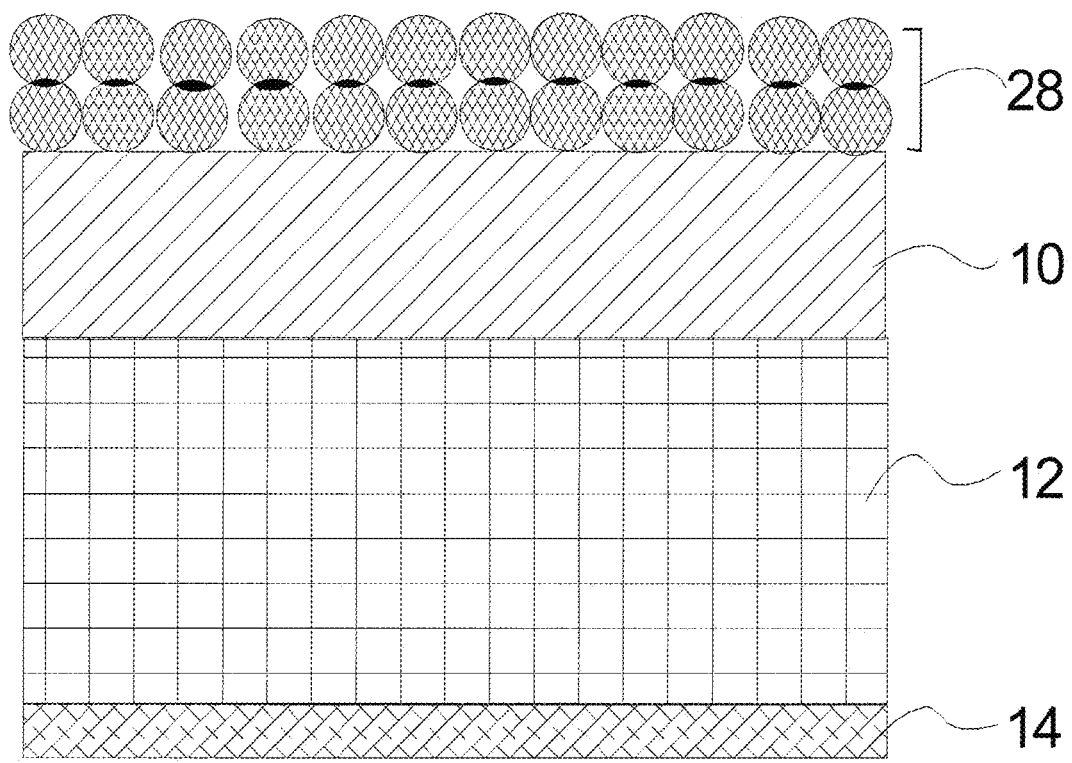
FIGS. 11(a) and (b) are schematic cross-sectional side views of a two particle thick REM applied to a dense electrolyte layer according to a second embodiment of the invention.
Figure 11B:
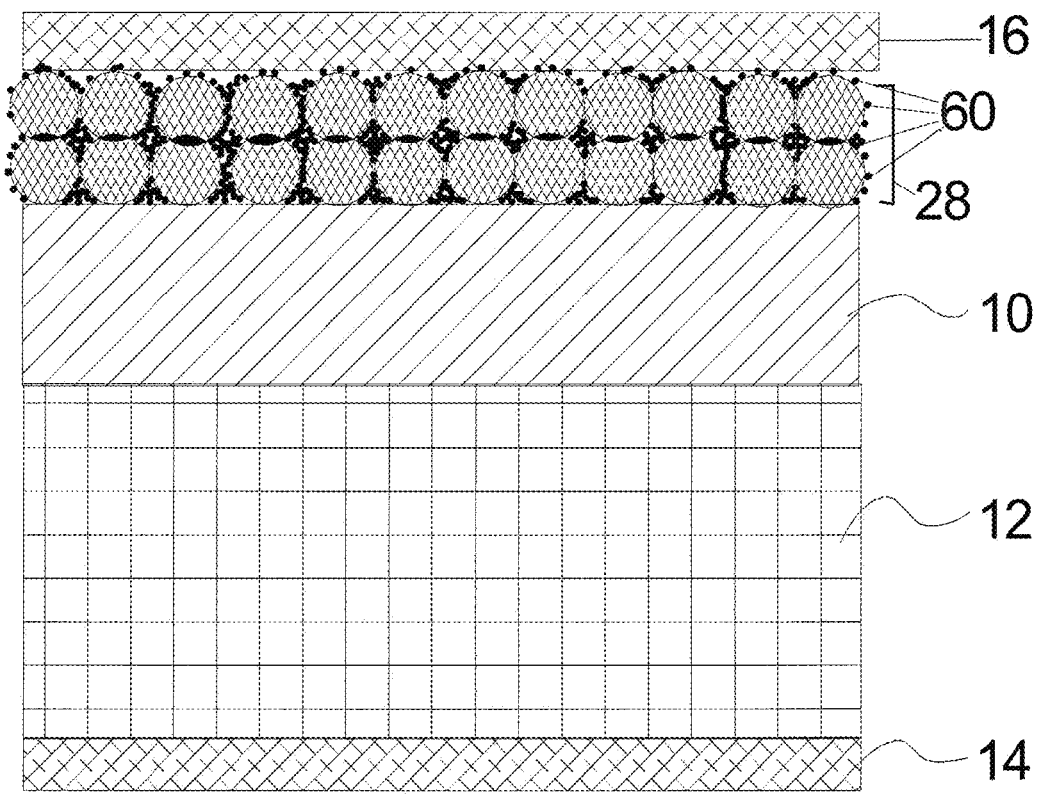

According to a second embodiment of the present invention and referring to FIGS. 11 (*a*)-(*b*), a coating of oxide-ion-conducting particles consisting of a small number of particle monolayers is formed on the surface of a previously-fabricated dense electrolyte layer, thereby forming an REM 28. The REM 28 can have between 2 and 5 monolayers, 2 and 10 monolayers or 1 and 25 monolayers, i.e., a coating consisting of 2-5, 2-10 or 2-25 particle diameters in thickness, with a coating thickness $\leq$3 μm. The REM 28 shown in FIG. 11*a* has a 2-particle diameter thickness. The REM 28 can be formed by applying a powder coating of ion-conducting particles on the dense electrolyte surface from a colloidally-stable ion-conducting particles suspension followed by drying and partial sintering of the powder coating. Partial sintering parameters such as time-temperature cycle are chosen in such a way to provide sufficient mechanical strength and adhesion of the REM 28 with the dense electrolyte 10. Application of electrocatalyst and cathode current collectors (not shown) are carried out as described in the first embodiment. Referring to FIG. 11(*b*), electrocatalyst 60 is located in the void network of the REM 28 and the porous cathode current collector layer 16 is in contact with the REM 28 and the cathode.

Third Embodiment

Figure 12:
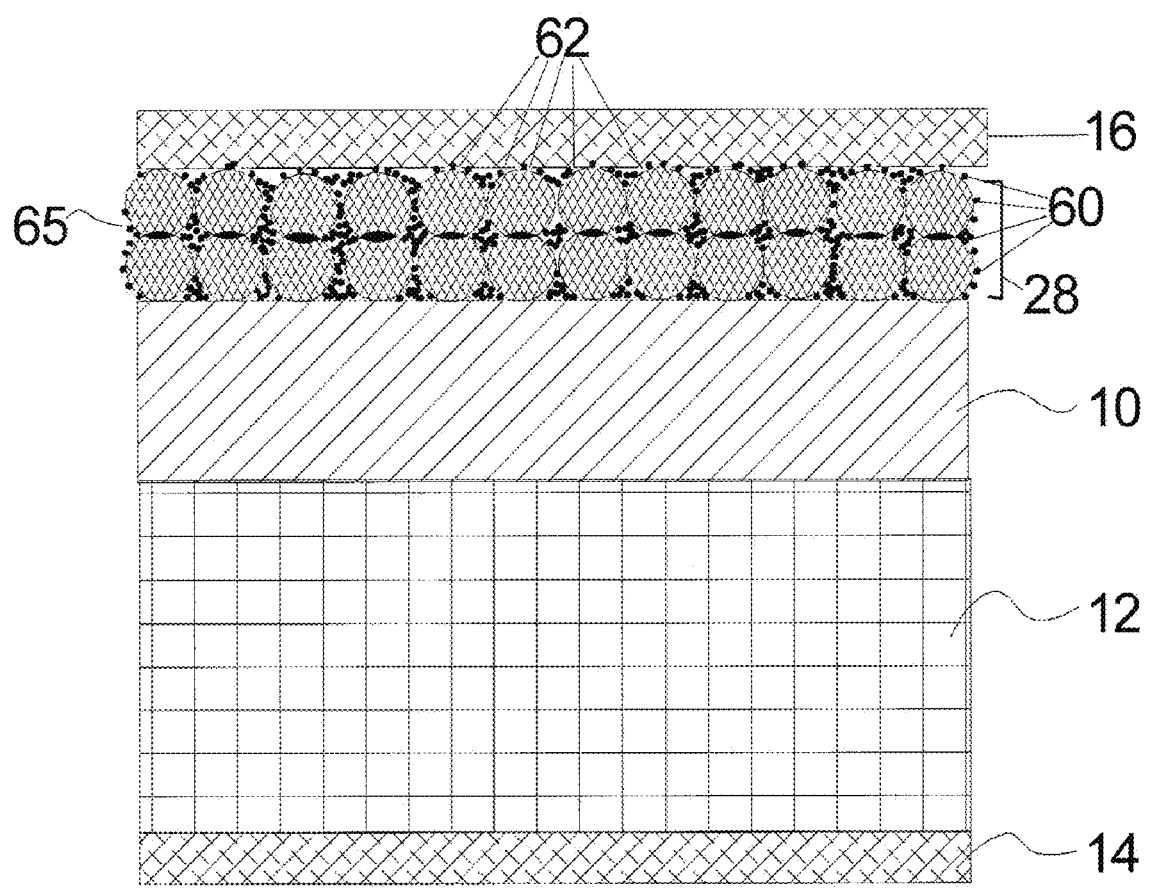
FIG. 12 is a schematic cross-sectional side view of a two particle thick REM and electrocatalyst and ion-conductor applied to the void networks of the REM according to a third embodiment of the invention.

According to a third embodiment of the invention and referring to FIG. 12, an REM 28 is formed on the electrolyte layer 10 as described in the second embodiment. Then, a cathode 65 is formed by infiltrating electrocatalyst 60 and ion-conductor 62 in the void network of the REM 28. The cathode material 65 may also include electron-conducting particles. Optionally, the cathode material 65 only includes electrocatalyst and electron conducting particles.

This can be carried out as described above, using combinations of particulate suspensions and/or chemical precursors of the desired materials.

Fourth Embodiment

According to a fourth embodiment of the invention and referring to FIGS. 4(*a*)-(*b*) and 7, one of the cathode structures 30 described above is infiltrated with an electron-conducting material into the pore space of the cathode structure 30 in order to create a penetrating electrode current collector (PECC) network 50. Infiltrate material is then sintered at low temperature to form the PECC 50. Infiltration may be conducted with a fine particle suspension, chemical precursor or fine particles and a chemical precursor of an electron-conducting material. The electron-conducting material may be selected from the group consisting of: Ag, Ag—Pd, Ag-alloys, Au and Au-alloys, Pt and Pt-alloys, and $In_2O_3$. This PECC network 50 may be electrically continuous from the dense electrolyte surface and extend to the exterior surface of the structure. An additional external coating of electron-conducting porous material 16 (shown in FIGS. 4(*a*)-(*b*) but not shown in FIG. 7) can be added to complete the cathode current collector. In FIG. 4(*a*), the cathode structure 30 primarily contains cathode electrocatalyst 60. In FIG. 4(*b*) the cathode structure 30, in addition to cathode electrocatalyst 60, also contains ion-conducting materials 62. This PECC network 50 provides a low resistance path for electrons to reach the cathode reaction zone. Optionally, electron-conductor infiltration can be performed completely or partially after the application of an external cathode current collector layer.

Generally, infiltration is performed multiple times to increase the loading. Infiltration can be completed before application of the current collector layer. Alternatively, a portion of the infiltration can be performed after application of the current collector layer. Or, the entire infiltration step can be performed after application of the current collector.

Fifth Embodiment

Figure 13A:
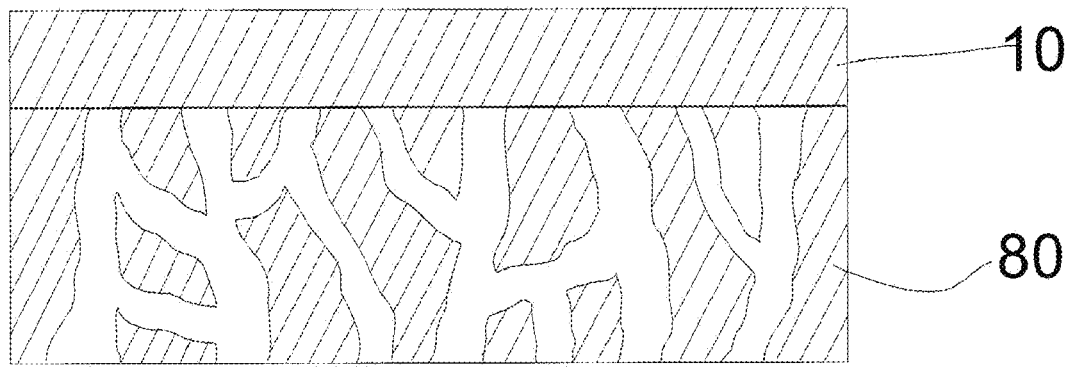
FIG. 13(a) shows the porous electrolyte attached with gas-impermeable electrolyte layer prior to infiltration.
Figure 13B:
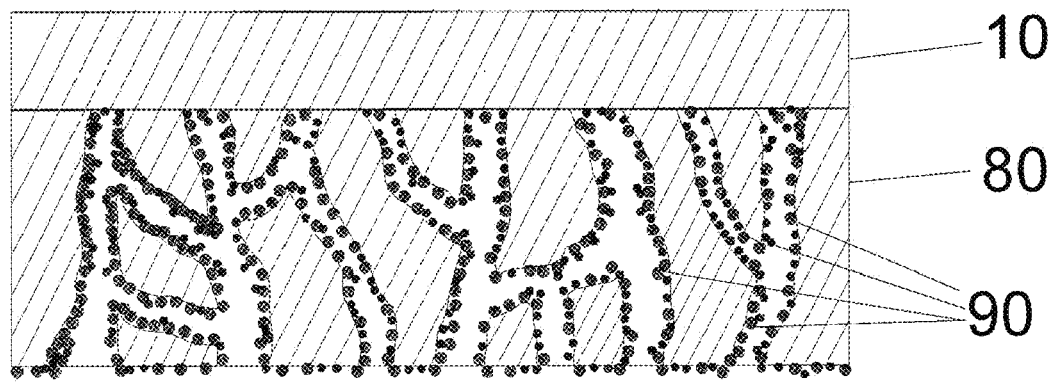
FIG. 13(b) shows the porous electrolyte after infiltration.
Figure 14:
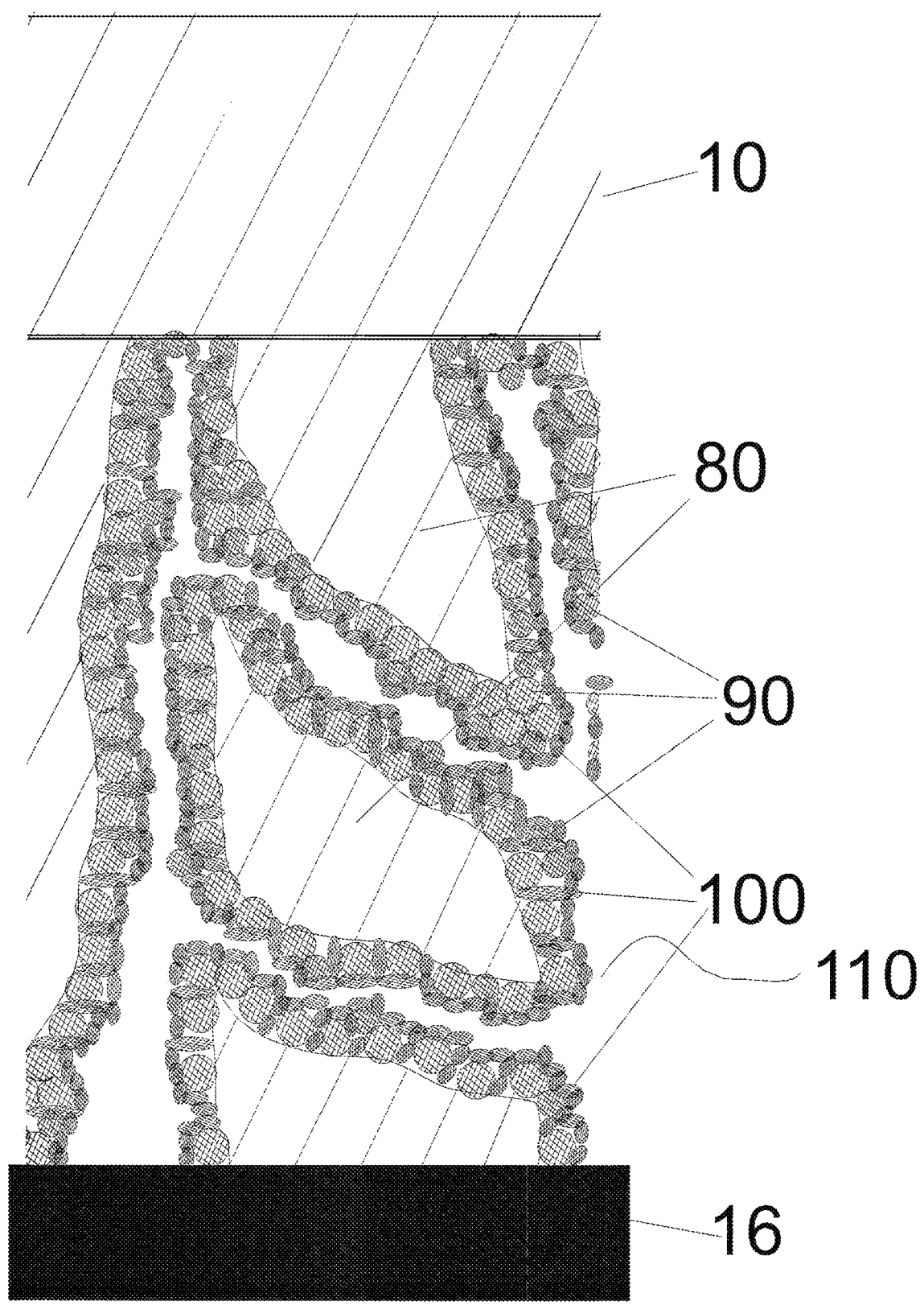
Figure 15:
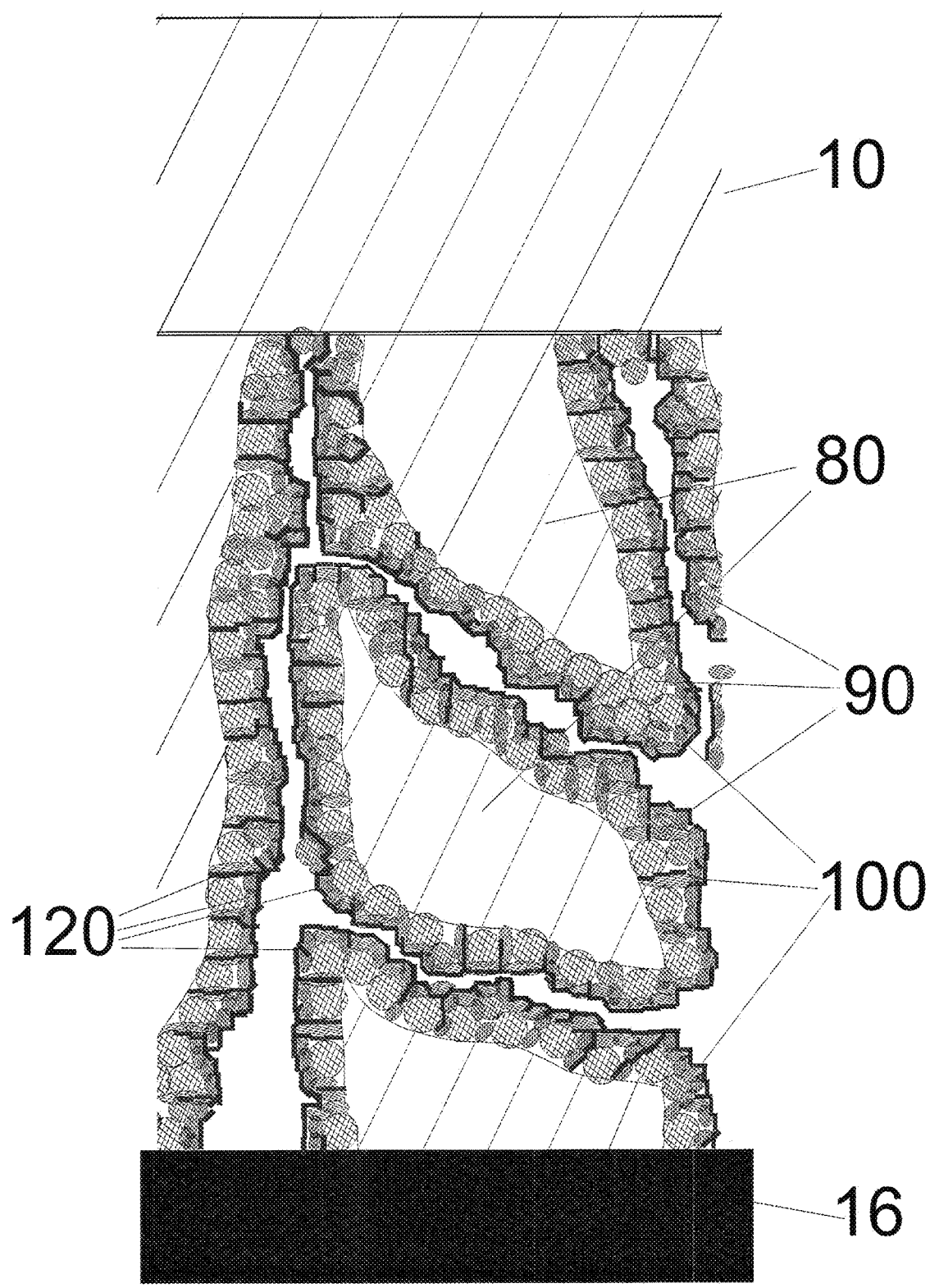

According to a fifth embodiment of the invention and referring to FIGS. 13-15, a partially fabricated SOFC cell 1 comprising a dense electrolyte layer 10 possessing a porous electrolyte layer 80 previously is created by various means known in the art. This porous layer 80 is infiltrated using particles, or chemical precursor or a mixture of chemical precursor and particles of ion-conducting materials to provide a coating 90 onto to the pore walls, onto the external surface of the porous electrolyte layer 80 and dense electrolyte 10 surface inside the porous layer 80. Through heat treatment this infiltrate is partially sintered onto to the pore walls and onto the external surface of the porous electrolyte layer 80 and dense electrolyte 10 surface inside the porous layer 80 to create the ion-conducting coating 90 (see FIG. 13*b*). This structure may be further infiltrated with ion-conducting material and heat treated to create a multi-scale hierarchical ion conducting coating (not shown). Either the coating 90 shown in FIG. 13*b* or the hierarchical ion conducting coating will be partially sintered to produce a REM having a majority of pores with an average pore diameter of less than one micron.

The ion-conducting portion of the coating 90 may be the same material as the dense electrolyte layer 10. In particular, the ion-conducting material may be selected from the group consisting of aliovalent-cation (a cation with different oxidation states than the host cation) doped zirconium oxide and cerium oxide, $La_{1-x}Sr_xGa_{1-y}MgyO_{3-\delta}$ (LSGM), yttrium-doped zirconia, scandium-doped zirconia, gadolinium-doped ceria, samarium-doped ceria, and yttrium-doped ceria.

The additional ion-conducting layer(s) may be a mixture of the ion conducting material and an inert material which may act as a grain growth inhibitor, such as alumina. The volume % of the inert material may be between 0 and 35% of the mixture.

Referring now to FIG. 14, a cathode structure 110 is created inside the void space of the ion-conducting layer 90 by infiltration methods as described in the first embodiment. Then a cathode current collector 16 is applied as described in the first embodiment. Referring to FIG. 15, a PECC 120 is optionally created in the cathode structure 110 by following the procedure described in the fourth embodiment.

Sixth Embodiment

According to a sixth embodiment of the invention, the top dense electrolyte surface of a partially prefabricated SOFC 1

(as shown in FIG. 5) is coated with a thin ($\leqq 3$ μm) REM 20 (as illustrated in FIG. 6) by ultrasonic spray pyrolysis deposition using aqueous precursor electrolyte solutions (e.g., YSZ ion-conductor (electrolyte) can be deposited from a nitrate solution of Zr and Y with the proper cation ratio. Samarium-doped ceria can be deposited from a nitrate solution of Ce and Sm with the proper cation ratio).

Now inside the void space of this ion-conducting REM, a cathode structure 30 (as illustrated in FIG. 7) is created by an infiltration method as described in the first embodiment. Then, a cathode collector 16 (as illustrated in FIG. 2) is applied onto the cathode structure as described in first embodiment. Optionally a PECC can be created in the cathode structure by following the procedure described in the fourth embodiment.

Seventh Embodiment

According to a seventh embodiment of the invention, the uncoated dense electrolyte surface of a partially prefabricated (without a cathode and its current collector) planar cell (as illustrated in FIG. 5) (this cell may be anode supported, self-supported, electrolyte supported, metal supported, current collector supported, cathode supported) is coated with a thin ($\leqq 3$ μm) ion-conducting electrolyte powder layer by suspension spraying or dipping or electrostatic spraying or thermal spraying or screen printing or by spray pyrolysis deposition, followed by partial sintering, (except in the case of thermal spraying and spray pyrolysis which may not need a partial sintering step) to create a REM 20 (as illustrated in FIG. 6). After forming this REM, a $2^{nd}$-level REM may be formed within the voids of the $1^{st}$ REM using one of the above-mentioned deposition techniques. Then, an infiltration is performed by dipping/wetting the extended porous electrolyte layer three to six times in a SSC ($Sm_{0.6}Sr_{0.4}CoO_{3-\delta}$) aqueous precursor solution and urea [$CO(NH_2)_2$] solution mixture. Between each SSC/urea impregnation, a drying stage at 90° C. (controlled humidity) and 225° C. is carried out, with a final heat treatment at 800° C. for 1H after the last impregnation to form the cathode 30 (as illustrated in FIG. 7). Using this method, SSC cathode material is introduced within the voids of the porous YSZ layer. After SSC heat treatment, the next fabrication step is to apply anode current collector 14 and cathode current collectors 16 by dipping, painting, screen printing (as illustrated in FIG. 2).

Example 1

Figure 16:
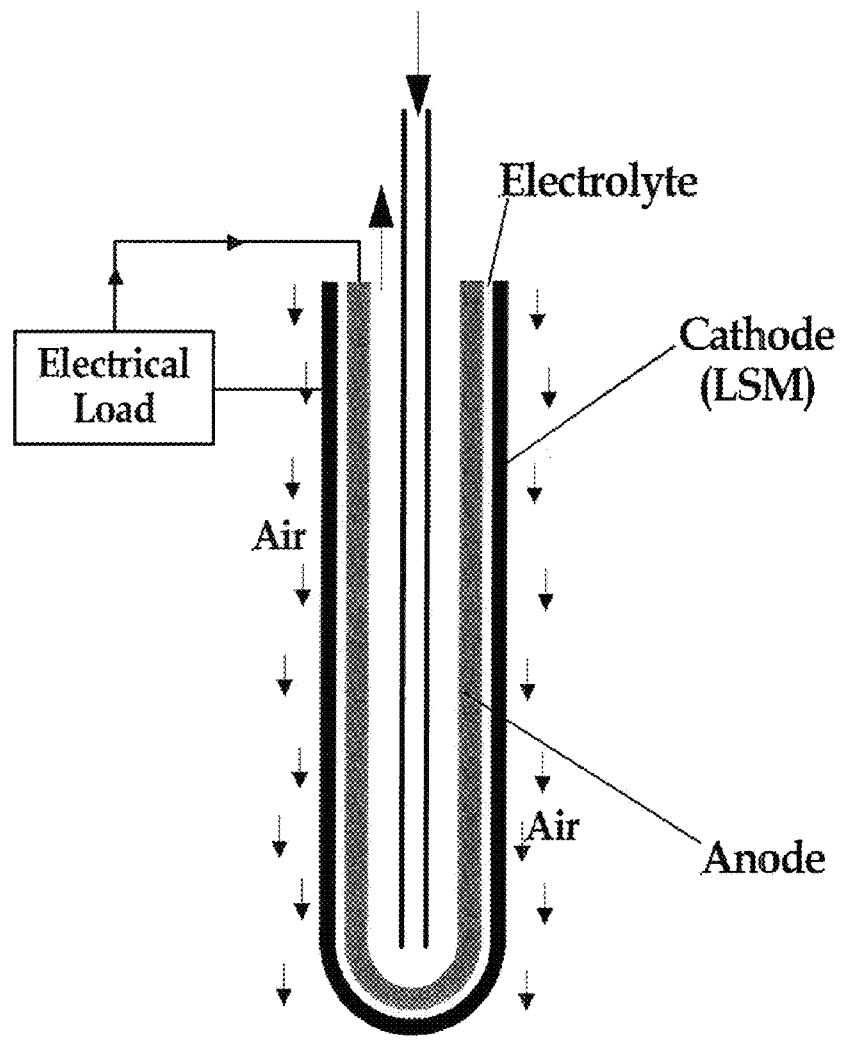
FIG. 16 is a schematic view of an single-end closed anode-supported SOFC single cell.

A sequential electrophoretic deposition (EPD) technique is employed to fabricate tubular multilayered μSOFC single cells. EPD is a colloidal forming technique where charged, colloidal particles from a stable suspension are deposited onto an opposite polarity substrate by application of a DC electric field. Present examples have tubular single cells that are anode-supported with its inner most layer being the anode support layer, as indicated in FIG. 16. Graphite rods have been used as an EPD substrate where on the outer surface of the graphite rod, three layers of material are deposited by a sequential EPD method. The first layer deposited by EPD is the anode-support layer, with a thickness of 25-500 μm (for a 3 mm diameter graphite rod, anode-support layer typical thickness is ~250 μm) deposited from a suspension containing pore former and ~55/45 weight fraction coarse NiO (average particle size ~0.65 μm) and Tosoh's 8 m/o-Yttria-Stabilized Zirconia (YSZ). This layer is followed by ~10 μm thick anode functional layer from a suspension containing 55/45 fraction of fine NiO (average particle size ~0.3 μm) and Tosoh YSZ. The final EPD layer is a <15 μm YSZ electrolyte layer. Pore former and coarse NiO are used in the anode-support layer to provide a microstructure with a higher amount of porosity and a larger pore diameter, this is to facilitate passage of reactant and product gases. The anode functional layer suspension typically does not have pore former (if containing pore former, amount <10 volume percentage of the inorganic powder in the suspension) and a finer NiO power is used to create a homogeneous microstructure with a high amount of triple phase boundary. All the above mentioned EPD suspensions (anode support layer, anode functional (active layer) and electrolyte layer YSZ suspensions) may have dispersants, binders and other additives to form a good EPD suspension for electrophoretic deposition. A typical YSZ suspension is prepared by adding 20 g of YSZ powder in 20 ml of anhydrous ethanol and then an appropriate amount (0.5-6 wt % of the YSZ powder) of polyethylenimine (PEI) dispersant is added. This mixture is then ball milled using YSZ milling media for 10-20H. After milling, binder (polyvinyl butyl) and 150 ml of anhydrous ethanol are added, this suspension is ultrasonicated, followed by overnight stirring. Now the YSZ-suspension is ready for electrophoretic deposition and dip coating. Electrophoretic deposition is conducted using a constant current condition with a semiautomated computer control set-up for current and graphite rod immersion control. Start to finish of the EPD process takes less than three minutes. In all the three suspensions, the particles are suspended in absolute ethanol using an ionic dispersant such that the particles are positively charged. After EPD, the samples are dried overnight at room temperature without any special precautions, followed by sintering at ~1375-1425° C. for 2-6 hours. During the sintering operation, the graphite rod, pore-former, and binders burn out, thereby forming a tubular partial SOFC cell. This partial cell has a porous anode support layer in intimate contact with a porous anode functional layer and a dense electrolyte layer in intimate contact with the anode functional layer. This cell does not have a cathode, cathode current collector, or anode current collector.

Figure 17:
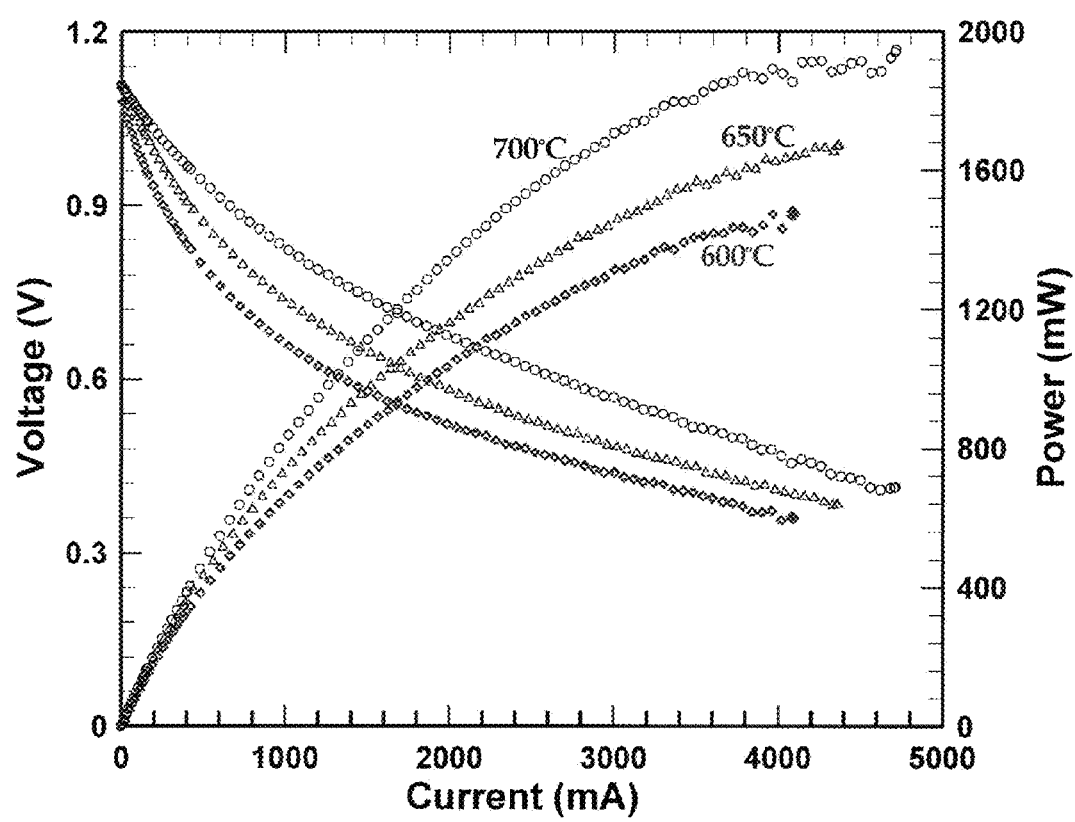
FIG. 17 is a graph of polarization and power density of a SOFC single cell at three different temperatures.

The above partially prefabricated (does not have cathode and current collectors) small diameter anode supported tubular cell has an outer dense YSZ electrolyte layer which is next coated with a YSZ particulate layer. This is accomplished by dipping the anode supported cell in the same EPD suspension used for the fabrication of dense YSZ electrolyte. These samples are dried at room temperature and then sintered at 1150° C. for 2 hours to form a REM. FIGS. 9a-b is a cross-sectional fracture surface SEM micrograph and FIGS. 10b-c is the SEM micrograph of the YSZ REM outer surface. Then, an impregnation is performed by dipping/wetting the REM three to six times in a SSC ($Sm_{0.6}Sr_{0.4}CoO_{3-\delta}$) aqueous precursor solution and urea [$CO(NH_2)_2$] solution mixture (see ref. Chun at al J. Electrochemical Soc. 153 (6) A1115-A1119 (2006)). Between each SSC/urea impregnation, a drying stage at 90° C. (controlled humidity) and 225° C. is carried out, with a final heat treatment at 800° C. for 1H after the last impregnation. Using this method, SSC cathode material is introduced within the voids of the YSZ-REM. After SSC heat treatment, the next fabrication step is to apply the anode and cathode current collectors. For a small diameter tubular sample, the gold conductive paste (with pore-former) is applied inside to the anode using a small diameter rod. The cathode current collector (same paste used for the anode current collector) is applied to the outside of the SOFC support (on the active cathode layer) using a small paint brush. After application of the current collectors, the sample is dried at 50° C. and lightly sintered at 725° C. for 1H. Optionally to increase the SSC loading in the cathode further SSC infiltration can be applied to the cathode active area after cathode current collector sintering. Further SSC/urea impregnations (dipping/wetting applications) will require the same aqueous solutions, and drying/sintering stages as initial SSC impregnations on the REM. The performance is shown in FIG. 17. The length of cathode layer is 2.5 cm and cell diameter is around 0.28 cm. This cell has peak power densities of ~865 mW/cm$^2$, 765 mW/cm$^2$ and 670 mW/cm$^2$ at 700° C., 650° C. and 600° C. respectively.

Example 2

The present example describes small diameter tubular single cells that are porous electrolyte-supported (PES), with the inner-most layer being the porous electrolyte (ion-conductor) support layer. This PES cell is partially fabricated by EPD. Graphite rods are used as the EPD substrate, with two particle layers being applied by a sequential EPD method. The first layer deposited by EPD is the porous ion-conductor support layer, with a thickness of ~200 µm (for a ~3 mm diameter graphite rod, support layer typical thickness is ~125-250 µm), this is formed from a suspension containing pore-former and Tosoh's 8 m/o-Yttria-Stabilized Zirconia (YSZ). This porous electrolyte-support layer thickness depends on the size and geometry of the cell, in case of circular tubular cell this thickness is approximately ≧5% of the cell diameter. This layer is followed by ~15 µm YSZ electrolyte layer. Pore former is used in the support layer to have the open porosity necessary to facilitate passage of reactant and product gases. All the above EPD suspensions may have dispersants, binders, and other additives to form a good EPD suspension for electrophoretic deposition. Electrophoretic deposition is conducted under the same conditions stated in Example 1. Drying and sintering time and temperatures is also as listed under Example 1. The result is a tubular partial SOFC cell. This partial cell has a porous ion-conductor-support layer in intimate contact with a gas-impermeable electrolyte layer. This cell does not have an anode, cathode, cathode current collector or anode current collector.

The above mentioned partially prefabricated small diameter porous electrolyte-supported tubular samples (with an outer YSZ electrolyte layer) are coated with a YSZ-ion-conductor powder layer by dipping in an YSZ suspension. This is accomplished by dipping the specimen in the same EPD suspension used for the dense YSZ electrolyte. These samples are dried in room temperature and then sintered at 1150° C. for 2H. This creates the REM on the outer surface of the cell. Then, multiple impregnations are performed by dipping/wetting the REM into a SSC (Sm$_{0.6}$Sr$_{0.4}$CoO$_{3-\delta}$) aqueous precursor solution and urea [CO(NH$_2$)$_2$] solution mixture. Between each SSC/urea impregnation, a drying stage at ~60-90° C. (controlled humidity) and ~225-300° C. is carried out, with a final heat treatment at ~800° C. for 2H after the last impregnation. Using this method, the SSC cathode material is introduced within the voids of the YSZ REM.

Using a solution impregnation or other techniques (such as suspension infiltration method), the porous electrolyte-support layer is converted to an anode layer. The next fabrication step is to apply anode and cathode current collectors, this application procedure, drying, and heat treatment is the same as described in Example 1.

Example 3

A partially prefabricated small diameter porous electrolyte-supported (PES) tubular specimen (as in Example 2) is coated with an YSZ powder layer by dipping in an YSZ suspension. This is accomplished by dipping the specimen in the same EPD suspension that is used for the dense YSZ electrolyte; these samples were dried in room temperature and then sintered at 1150° C. for 2H. This creates a YSZ REM on the outer surface of the cell. Then, a multiple impregnation method is performed by dipping/wetting the REM with a nickel, platinum or copper aqueous precursor solution or mixture of solutions. Between each impregnation, a drying stage at ~60-300° C. (controlled or uncontrolled humidity) is carried out, with a final heat treatment at ~600-800° C. for 2H after the last impregnation. Using this method, anode material is introduced into the voids of the YSZ-REM.

Using solution impregnation or other techniques, such as a suspension infiltration method, the porous electrolyte support layer is converted to a cathode layer. The next fabrication step is to apply anode and cathode current collectors, which are carried out in the same manner as in example 1 above.

Example 4

Starting with a partially prefabricated small diameter PES tubular specimen, as produced by the methods of Example 2, an YSZ REM is applied to the outer surface of the PES specimen (using same method described in Example 2). Then, an anode in the void space of the YSZ-REM is formed using the same method as described in Example 3.

To create the HREM, infiltrate the porous ion-conductor support layer with an ion-conductor precursor liquid/or ion-conductor suspension/or a mixture of ion-conductor suspension and ion-conductor precursor. Then a heat treatment is provided in such a way that a fine porous ion-conducting coating is partially sintered onto the pore walls of the porous electrolyte support layer, thereby creating a 1$^{st}$ order HREM as shown in schematically in FIG. 13b. Now, multiple impregnations are performed by dipping/wetting the HREM with a SSC (Sm$_{0.6}$Sr$_{0.4}$CoO$_{3-\delta}$) aqueous precursor solution and urea [CO(NH$_2$)$_2$] solution mixture. Between each SSC/urea impregnation, a drying stage at 60-90° C. (controlled humidity) and 225-300° C. is carried out, with a final heat treatment at 800° C. for 2H after the last impregnation. Using this method, SSC cathode material is introduced within the voids of the HREM. Therefore, a cathode for the SOFC cell is created in the HREM. The next fabrication step is to apply anode and cathode current collectors, which is carried out as in Example 1.

While a particular embodiment of the present invention has been described in the foregoing, it is to be understood that other embodiments are possible within the scope of the invention and are intended to be included herein. It will be clear to any person skilled in the art, that modifications of and adjustments to this invention, not shown, are possible without departing from the spirit of the invention as demonstrated through the exemplary embodiment. The invention is therefore to be considered limited solely by the scope of the appended claims.

What is claimed:

1. A method of manufacturing a solid state electrochemical cell, the method comprising the steps of:
   (a) applying ion-conducting material onto at least one side of a sintered dense electrolyte layer then partially sintering the applied ion-conducting material to form a porous reticulated electrode matrix (REM) on the electrolyte layer having a majority of pores with an average diameter of less than one micron; and
   (b) infiltrating the REM with electrode material that includes electrocatalyst particles, then heat treating the electrode material to form an electrode, wherein the partial sintering is a heat treatment performed at a time-temperature cycle that causes the ion-conducting material to density to a density less than a maximum density of the material.

2. A method as claimed in claim 1 wherein the ion-conducting material is applied by dip-coating the electrolyte in a well dispersed zirconia suspension.

3. A method as claimed in claim 2 wherein the zirconia suspension is a YSZ suspension and the partial sintering is performed at between 1000-1150° C.

4. A method as claimed in claim 1 wherein the partial sintering is carried out at $\leqq 0.9$ fraction of the sintering temperature of the ion-conducting material required to form a dense layer of the ion-conducting material.

5. A method as claimed in claim 1 wherein the ion-conducting material is applied by ultrasonic spray pyrolysis deposition using an aqueous precursor electrolyte solution.

6. A method as claimed in claim 1 wherein the ion-conducting material is oxide particles from an ion-conducting chemical precursor selected from the group consisting of a sol-gel precursor, organo-metallic precursor, and nitrate solution precursor.

7. A method as claimed in claim 1 wherein the porous REM is formed without use of pore formers.

8. A method as claimed in claim 1 further comprising between steps (a) and (b): infiltrating the REM with additional ion-conducting material then heat treating the additional ion-conducting material to form a multi-scale hierarchal REM.

9. A method as claimed in claim 8 wherein the electrode material is applied by infiltration using a particulate suspension of cathode electrocatalyst, or a suspension of a mixture of different electrocatalyst particles, or a solution of one or more electrocatalyst chemical precursors, or a mixture of one or more electrocatalyst particles and electrocatalyst chemical precursors.

10. A method as claimed in claim 8 wherein the electrode material further includes one or more materials selected from the group consisting of ion-conducting material, electron-conducting material, and mixed ion-electron conducting materials.

11. A method as claimed in claim 1 wherein the electrode material includes ion-conducting material which are applied onto the dense electrolyte layer by a technique selected from the group consisting of slurry coating, dip coating, spray coating, spin coating, screen printing, tape casting, brush painting, spray pyrolysis coating, chemical vapor deposition, physical vapor deposition, sputtering, electrostatic casting, and electrostatic coating.

12. A method as claimed in claim 1 further comprising infiltrating the electrode with an electron-conducting material then sintering the electron-conducting material to form a penetrating electrode current collector.

13. A method as claimed in claim 12 further comprising applying a current collector material onto the penetrating electrode current collector then heat treating the current collector material to form a porous current collector layer.

14. A method as claimed in claim 13 wherein the current collector material is applied by one of dip-coating, spraying, or painting a paste of conductive particles and pore-forming sacrificial particles.

15. A method as claimed in claim 1 further comprising between steps (a) and (b): applying a current collector material onto the REM then heat treating the current collector material to form a porous current collector layer, and in step (b) the electrode material infiltrates both the current collector and REM.

16. A method as claimed in claim 1 wherein the REM is formed having at least one of a porosity of 5 to 80%, thickness of or below 3.00 microns, and a mean grain size of 0.010 to 3.00 microns.

17. A method as claimed in claim 16 wherein the mean grain size is less than 1.00 micron.

18. A method as claimed in claim 17 wherein the REM has an average thickness selected from the group consisting of between one and twenty-five ion-conducting particles, one and ten ion-conducting particles, and one and five ion-conducting particles.

19. A method of manufacturing a solid state electrochemical cell, the method comprising the steps of:
(a) obtaining a partially fabricated electrochemical cell comprising a porous electrolyte layer on a first surface of a dense electrolyte layer;
(b) infiltrating the porous electrolyte layer with ion-conducting material then partially sintering the ion-conducting material to form an ion-conducting coating having a majority of pores with an average diameter of less than one micron; and
(c) infiltrating the coated porous electrolyte layer with electrode material including electrocatalyst material, then heat treating the electrode material to form an electrode,
wherein the partial sintering is a heat treatment performed at a time-temperature cycle that causes the ion-conducting material to density to a density less than a maximum density of the material.

20. A method as claimed in claim 19 wherein the ion conducting material is partially sintered onto pore walls and external surface of the porous electrolyte layer and on the first surface of the dense electrolyte layer.

21. A method as claimed in claim 19 wherein the ion-conducting coating is the same material as the dense electrolyte layer.

22. A method as claimed in claim 19 wherein the ion-conducting material is selected from the group consisting of aliovalent-cation (a cation with different oxidation states than the host cation) doped zirconium oxide and cerium oxide, $La_{1-x}Sr_xGa_{1-y}MgyO_{3-\delta}$ (LSGM), yttrium-doped zirconia, scandium-doped zirconia, gadolinium-doped ceria, samarium-doped ceria, and yttrium-doped ceria.

23. A method as claimed in claim 19 further comprising between steps (b) and (c) infiltrating the porous electrolyte layer coated with the ion-conducting coating with additional ion-conducting material then heat treating the additional ion-conducting material to form a multi-scale hierarchal ion-conducting coating.

24. A method as claimed in claim 23 wherein the additional ion-conducting material is a mixture of ion conducting particles and an inert grain growth inhibitor material.

25. A method as claimed in claim 24 wherein the inert grain growth inhibitor material is alumina and the volume % of alumina is between 0 and 35% of the mixture.

26. A method as claimed in claim 25 further comprising infiltrating the electrode with an electron-conducting material then sintering the electron-conducting material to form a penetrating electrode current collector.

27. A solid state electrochemical cell comprising:
(a) a dense electrolyte layer;
(b) a, porous, reticulated electrode matrix (REM) of partially sintered ion-conducting material on at least one side of the dense electrolyte layer having a majority of pores with an average diameter of less than one micron, wherein the partial sintering is a heat treatment performed at a time-temperature cycle that causes the ion-conducting material to densify to a density less than a maximum density of the material; and (c) electrode material including electrocatalyst particles, the electrode material located substantially within the REM.

28. A solid state electrochemical cell as claimed in claim 27 wherein the REM has at least one of a porosity of 5 to 80%, thickness between 0.010 and 3.00 microns, and a mean grain size of 0.010 to 3.00 microns.

29. A solid state electrochemical cell as claimed in claim 28 wherein the REM has a porosity of 10-50%.

30. A solid state electrochemical cell as claimed in claim 27 wherein the outer surface of the REM is coated with an electronically conductive layer which serves as a current collector.

31. A solid state electrochemical cell as claimed in claim 27 wherein the REM has an average thickness selected from the group consisting of between one and twenty-five ion-conducting particles, one and ten ion-conducting particles, and one and five ion-conducting particles.

32. A solid state electrochemical cell as claimed in claim 27 wherein at least some of the pore spaces of the REM are filled with a porous ion-conducting material with a majority of pores having an average pore size smaller than that of the majority of pores of the REM.

33. A solid state electrochemical cell as claimed in claim 27 wherein the ion-conducting material of the REM is the same material as the dense electrolyte.

34. A solid state electrochemical cell as claimed in claim 33 wherein the ion conducting material of the REM is selected from the group consisting of aliovalent-cation doped zirconium oxide and cerium oxide, $La_{1-x}Sr_xGa_{1-y}MgyO_{3-\delta}$ (LSGM), yttrium-doped zirconia, scandium-doped zirconia, gadolinium-doped ceria, samarium-doped ceria, and yttrium-doped ceria.

35. A solid state electrochemical cell as claimed in claim 34 wherein the REM composition is a mixture of the ion-conducting material and an electrocatalyst or electron-conducting material.

36. A solid state electrochemical cell as claimed in claim 35 wherein the REM composition includes LSM.

37. A solid state electrochemical cell as claimed in claim 36 wherein the REM composition includes electrocatalyst material of between 0 and 50 vol. %.

38. A solid state electrochemical cell as claimed in claim 37 wherein the REM composition includes a grain growth inhibitor material of between 0 and 35 vol. %.

39. A solid state electrochemical cell as claimed in claim 38 wherein the grain growth inhibitor material is alumina.

40. A solid state electrochemical cell as claimed in claim 27 wherein the electrode material is located on the pore walls and outer surface of the REM, and on the surface of the electrolyte layer.

41. A solid state electrochemical cell as claimed in claim 40 wherein the electrode coating is a cathode coating, which comprises electrocatalyst particles and at least one material selected from the group consisting of ion-conducting material, electron-conducting material, and mixed ion-electron conducting materials.

42. A solid state electrochemical cell as claimed in claim 41 wherein the electrocatalyst particles are selected from the group consisting of SSC, LSM, LSF and LSCF, BSCF $(Ba_xSr_{1-x}Co_yFe_{y-1}O_{3-\delta})$.

43. A solid state electrochemical cell as claimed in claim 27 wherein the REM is for an anode, and the electrocatalyst particles are nickel, the ion-conducting materials are selected from the group consisting of Yttrium-doped Zirconium Oxide ("YSZ"), Scandium-doped Zirconium Oxide ("SSZ"), Scandium-Cerium-doped Zirconia ("SCSZ"), aliovalent-cation doped zirconium oxide, gadolinium-doped Cerium Oxide, samarium-doped Cerium Oxide, and doped Lanthanum Gallate, and the mixed ion-conducting materials are selected from the group consisting of Yttrium-doped Strontium Titanate, aliovalent-cation doped Cerium oxide.

44. A solid state electrochemical cell as claimed in claim 27 wherein the REM is further coated with a porous coating of electron-conducting material that penetrates the voids of the REM and electrode to produce a penetrating electrode current collector (PECC).

* * * * *